United States Patent
Kim et al.

(10) Patent No.: US 11,740,550 B2
(45) Date of Patent: *Aug. 29, 2023

(54) METHOD OF PERFORMING OPTICAL PROXIMITY CORRECTION AND METHOD OF MANUFACTURING LITHOGRAPHIC MASK BY USING THE SAME

(71) Applicant: SAMSUNG ELECTRONICS CO., LTD., Suwon-si (KR)

(72) Inventors: Sanghun Kim, Seoul (KR); Joobyoung Kim, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

This patent is subject to a terminal disclaimer.

(21) Appl. No.: 17/534,506

(22) Filed: Nov. 24, 2021

(65) Prior Publication Data

US 2022/0082930 A1   Mar. 17, 2022

Related U.S. Application Data

(63) Continuation of application No. 16/848,906, filed on Apr. 15, 2020, now Pat. No. 11,215,919.

(30) Foreign Application Priority Data

Sep. 9, 2019 (KR) .................... 10-2019-0111566

(51) Int. Cl.
*G06F 30/30* (2020.01)
*G03F 1/36* (2012.01)
(Continued)

(52) U.S. Cl.
CPC ............ *G03F 1/36* (2013.01); *G03F 7/70441* (2013.01); *G06F 30/398* (2020.01); *G06F 2119/18* (2020.01)

(58) Field of Classification Search
CPC .......... G03F 1/36; G03F 7/70441; G03F 1/70; G03F 7/70775; G06F 30/398; G06F 2119/18; Y02P 90/02
See application file for complete search history.

(56) References Cited

U.S. PATENT DOCUMENTS 6,077,310 A   6/2000  Yamamoto et al.
6,625,801 B1  9/2003  Pierrat et al.
(Continued)

FOREIGN PATENT DOCUMENTS

JP           3947755 B2    7/2007
JP           3954216 B2    8/2007
KR  10-2017-0128719 A    11/2017

*Primary Examiner* — Jack Chiang
*Assistant Examiner* — Brandon Bowers
(74) *Attorney, Agent, or Firm* — Lee IP Law, P.C.

(57) ABSTRACT

A method of manufacturing a lithographic mask includes performing optical proximity correction (OPC) for correcting an optical proximity effect (OPE) on a design layout, and forming a lithographic mask based on the design layout corrected by performing the OPC, wherein performing the OPC includes generating a plurality of segments. and adjusting a bias of the plurality of segments, and the plurality of dissection positions include global uniform dissection positions defined for each third length based on a global coordinate system that is a coordinate system of the whole design layout.

20 Claims, 29 Drawing Sheets

(51) Int. Cl.
    *G03F 7/00*     (2006.01)
    *G06F 30/398*     (2020.01)
    *G06F 119/18*     (2020.01)

(56) References Cited

U.S. PATENT DOCUMENTS

| | | |
|---|---|---|
| 7,003,756 B2 | 2/2006 | Zhang |
| 7,003,757 B2 | 2/2006 | Pierrat et al. |
| 7,157,192 B2 | 1/2007 | Morita |
| 7,530,049 B2 | 5/2009 | Kobayashi et al. |
| 7,817,844 B2 | 10/2010 | Kitamura et al. |
| 7,827,520 B2 | 11/2010 | Choi |
| 7,900,170 B2 | 3/2011 | Suh et al. |
| 8,122,385 B2 | 2/2012 | Fukuhara et al. |
| 8,334,539 B2 | 12/2012 | Kim et al. |
| 8,381,153 B2 | 2/2013 | Chiang et al. |
| 8,832,610 B2 | 9/2014 | Ye et al. |
| 9,116,438 B2 | 8/2015 | Lee et al. |
| 9,671,686 B2 | 6/2017 | Choi et al. |
| 9,715,170 B2 | 7/2017 | Jang et al. |
| 9,996,658 B2 | 6/2018 | Kim et al. |
| 10,216,890 B2 | 2/2019 | Qian |
| 2005/0074679 A1 | 4/2005 | Hiroshima |
| 2014/0220713 A1 | 8/2014 | Dowski, Jr. et al. |
| 2017/0024510 A1 | 1/2017 | Shin et al. |
| 2017/0242333 A1* | 8/2017 | Li .............................. G03F 1/36 |
| 2018/0300443 A1 | 10/2018 | Wong et al. |
| 2019/0094710 A1 | 3/2019 | Wang et al. |
| 2020/0192996 A1 | 6/2020 | Kang et al. |

\* cited by examiner

METHOD OF PERFORMING OPTICAL PROXIMITY CORRECTION AND METHOD OF MANUFACTURING LITHOGRAPHIC MASK BY USING THE SAME

CROSS-REFERENCE TO RELATED APPLICATION

This is a continuation of U.S. patent application Ser. No. 16/848,906, filed Apr. 15, 2020, which is incorporated by reference herein in its entirety.

Korean Patent Application No. 10-2019-0111566, filed on Sep. 9, 2019, in the Korean Intellectual Property Office, and entitled: "Method of Performing Optical Proximity Correction and Method of Manufacturing Lithographic Mask by Using the Same," is incorporated by reference herein in its entirety.

BACKGROUND

1. Field

Embodiments relate to an optical proximity correction method and a method of manufacturing a lithographic mask by using the same.

2. Description of the Related Art

During a lithography process in a semiconductor device manufacturing process, a circuit pattern pre-formed on a lithographic mask is transferred onto a photoresist formed on a substrate through exposure and development. Due to miniaturization of patterns in a semiconductor device, the use of a lithography technique using extreme ultraviolet (EUV) light and electron beams has gradually increased. However, the miniaturized patterns may cause an optical proximity effect (OPE), i.e., a pattern formed on a lithographic mask may be distorted when transferred to a substrate due to influence between neighboring patterns. Therefore, an optical proximity correction (OPC) may be performed, so a pattern on a lithographic mask may be changed in advance, e.g., by predicting a dimensional change during a transfer of a pattern during photolithography, such that a pattern shape according to a desired layout may be obtained after the transfer of the pattern.

SUMMARY

According to some embodiments, there is provided a method of manufacturing a lithographic mask, the method including providing a design layout having a plurality of patterns for manufacturing a semiconductor device, performing optical proximity correction (OPC) for correcting an optical proximity effect (OPE) on the design layout, and forming a lithographic mask based on the design layout corrected by performing the OPC. The performing of the OPC may include defining a plurality of dissection positions on edges of the plurality of patterns to generate a plurality of segments based on the plurality of dissection positions, wherein the segments are line segments generated by dissecting the edges, and adjusting a bias of the plurality of segments, wherein the plurality of dissection positions may include corner dissection positions defined as positions spaced apart by a first length from each of corners of each of the plurality of patterns, projection dissection positions defined by projections from each of the corners onto adjacent patterns, ripple dissection positions for preventing a non-intended linewidth change of the plurality of patterns, local uniform dissection positions defined for each second length based on each of local coordinate systems having any one of the corners as an origin, and global uniform dissection positions defined for each third length based on a global coordinate system that is a coordinate system of the whole design layout.

According to some other embodiments, there is provided a method of performing optical proximity correction (OPC) for correcting an optical proximity effect (OPE) on a design layout including a plurality of patterns for manufacturing a semiconductor device. The method may include: generating a plurality of segments by dividing edges of the plurality of patterns, and adjusting a bias of the plurality of segments, wherein the generating of the plurality of segments includes: determining, as first dissection positions, positions spaced apart by a first length from each of corners of the plurality of patterns, determining, as second dissection positions, positions obtained by vertically or horizontally projecting each of the corners onto adjacent patterns, determining third dissection positions around the first and second dissection positions to prevent generation of ripples, performing local uniform dissection for determining fourth dissection positions for each second length based on local coordinate systems using the corners as origins, and performing global uniform dissection for determining fifth dissection positions for each third length based on a global coordinate system that is a coordinate system of the whole design layout.

According to some other embodiments, there is provided a method of performing optical proximity correction (OPC) for correcting an optical proximity effect (OPE) on a design layout including a plurality of patterns for manufacturing a semiconductor device, the method including: defining a plurality of dissection positions on each of edges of the plurality of patterns so as to dissect each of the edges into a plurality of segments, and adjusting a bias of the plurality of segments, wherein the plurality of dissection positions include: first dissection positions defined as positions spaced apart by a first length from each of corners of each of the plurality of patterns, second dissection positions defined by projections from each of the corners onto adjacent patterns, third dissection positions for preventing a change in a linewidth of the plurality of patterns, fourth dissection positions defined for each second length based on each local coordinate system having any one of the corners of the plurality of patterns as an origin, and fifth dissection positions defined for each third length based on a global coordinate system that is a coordinate system of the whole design layout, and the defining of the plurality of dissection positions includes excluding any one of two neighboring dissection positions among the first to fifth dissection positions from the first to fifth dissection positions when a distance between the two neighboring dissection positions is less than a fourth length.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1A:
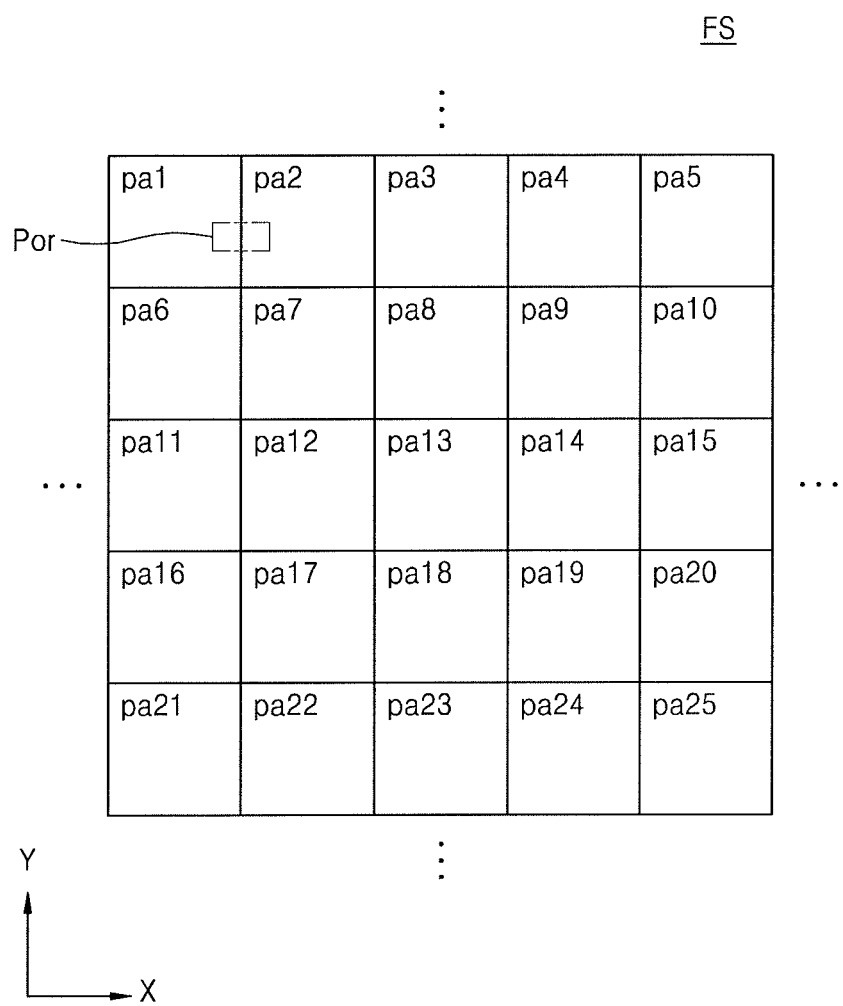
FIGS. 1A and 1B illustrate schematic layout diagrams for describing an optical proximity correction (OPC) method according to some embodiments.

Hereinafter, embodiments will be described in detail with reference to the accompanying drawings. Like reference numerals in the drawings denote like elements, and thus their repetitive description will be omitted.

Figure 1B:
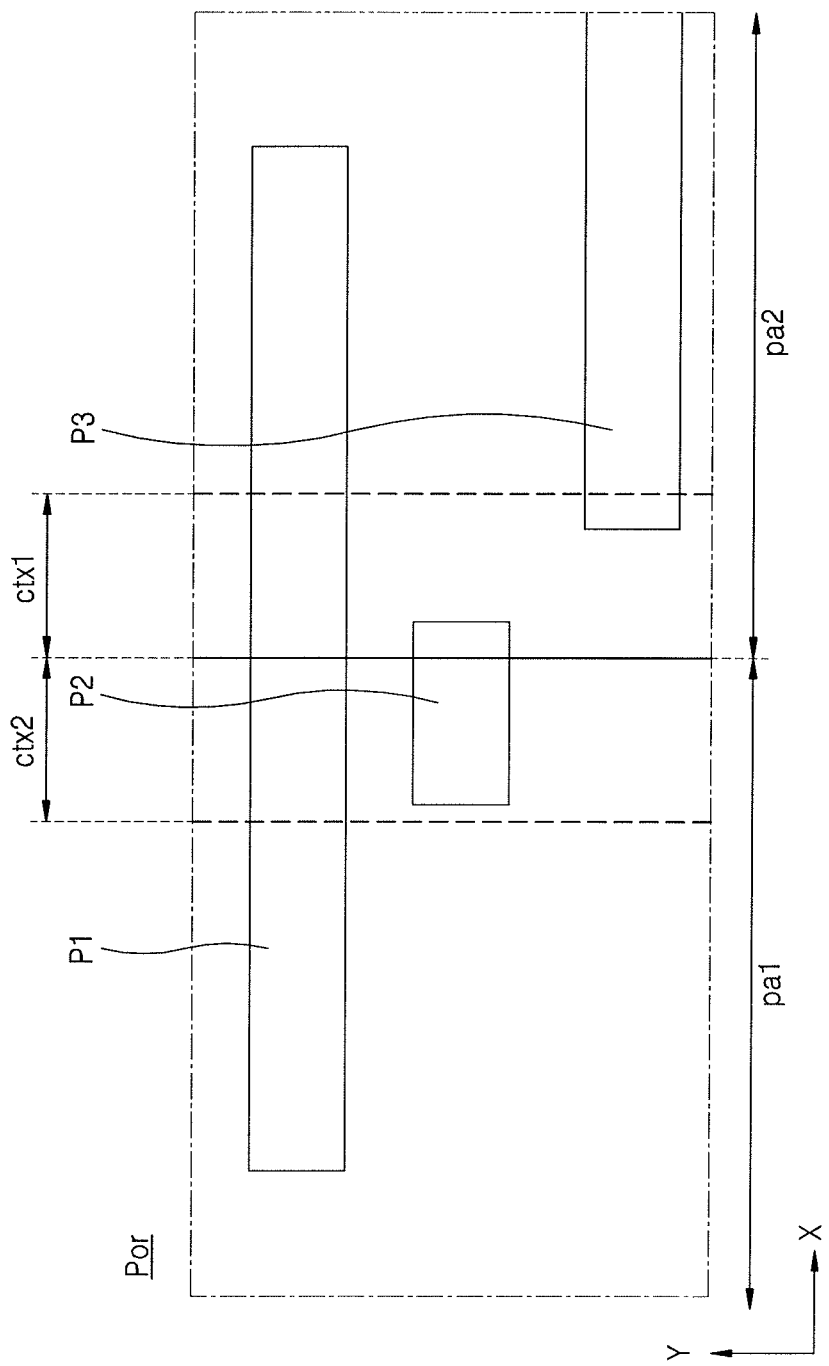

FIGS. 1A and 1B are schematic layout diagrams for describing an optical proximity correction (OPC) method according to some embodiments. In detail, FIG. 1A shows a portion of a design layout of a full shot FS including a plurality of patches pa1 to pa25, and FIG. 1B is a magnified diagram of a portion P of FIG. 1A.

Referring to FIG. 1A, the full shot FS may be a total area of a lithographic mask transferrable onto a wafer (or a photoresist formed on the wafer) through one time of exposure, e.g., a full-shot may correspond to an entire mask pattern transferred through a single scanning. Herein, lithography is a technique of transferring a previously prepared mask pattern onto a wafer through an exposure and development process. In general, a pattern formed on a lithographic mask has a larger size than an actually implemented wafer, and thus, the pattern may be reduced when transferred onto a wafer. Because patterns actually implemented on a wafer are very fine, a larger pattern than a real pattern may be formed on a lithographic mask, thereby improving the accuracy of pattern formation.

Lithography equipment may transfer a mask pattern to a wafer by a scanning scheme and a stepping scheme for continuous photographing. The scanning scheme may be, e.g., a linear transfer scheme, and the stepping scheme may be, e.g., a surface transfer scheme. For extreme ultraviolet (EUV) lithography, the scanning scheme is generally used.

In an EUV exposure apparatus, scanning may be performed by using a slit which limits an EUV beam to a portion of a lithographic mask. Herein, the slit may be a device for limiting light in an apparatus for performing an EUV exposure process, such that the light is uniformly emitted on an EUV mask. A pattern formed on a lithographic mask may be continuously transferred onto a wafer while limiting light by the slit so as to be emitted on a partial region of the lithographic mask and moving the lithographic mask in a direction opposite to a scanning direction.

The full shot FS may have, e.g., a horizontal length of approximately 26 mm and a vertical length of approximately 33 mm. Herein, a design layout on the full shot FS may include two-dimensional patterns. For convenience of description, directions orthogonal to each other on the design layout are defined as an X direction and a Y direction. Patches pa1 to pa25 measure approximately 1 μm by approximately 1 μm, and thus millions of patches pa1 to pa25 may be arranged in one full shot FS. The patches pa1 to pa25 may be arranged to construct a matrix in the X direction and the Y direction. The edges of each patch may be substantially parallel to any one of the X direction and the Y direction.

Referring to FIG. 1B, the portion P may be located over a first patch pa1 and a second patch pa2. The second patch pa2 may include a first background region ctx1. OPE is caused by an influence between adjacent patterns, and thus, even when OPC is performed, and a segment included in the OPC is generated, an influence by patterns outside the first and second patches pa1 and pa2 needs to be considered. The first background region ctx1 may be a portion of the second patch pa2 to be considered while performing OPC including generation of a segment with respect to the first patch pa1. Likewise, a second background region ctx2 may be a portion of the first patch pa1 to be considered while performing OPC including generation of a segment with respect to the second patch pa2.

In the portion P, a first pattern P1, a second pattern P2, and a portion of a third pattern P3 may be arranged. For example, as illustrated in FIG. 1B, the first through third patterns P1 through P3 may be linear patterns extending in parallel to each other, e.g., along the X direction.

For example, the first pattern P1 may extend, e.g., continuously, on the first and second patches pa1 and pa2. The first pattern P1 may start from the first patch pa1, pass through the first and second background regions ctx1 and ctx2, and extend to the second patch pa2.

For example, the second pattern P2 may extend, e.g., continuously, on the first and second background regions ctx1 and ctx2. The second pattern P2 may extend only within the first and second background regions ctx1 and ctx2 such that the second pattern P2 does not include a portion outside the first and second background regions ctx1 and ctx2.

For example, the third pattern P3 may be arranged, e.g., only, in the second patch pa2. The third pattern P3 may start from the first background region ctx1 and extend to the outside of the first background region ctx1, e.g., only within the second patch pa2. The third pattern P3 may be horizontally spaced apart from the first patch pa1, e.g., the first and third pattern P1 and P3 may be offset from each other along the X direction.

For convenience of description, the patterns shown in FIG. 1B extend in the X direction (i.e., have a length in the X direction that is greater than a length in the Y direction). However, embodiments are not limited thereto, e.g., the first through third patterns P1 through P3 may extend in the Y direction.

Figure 2:
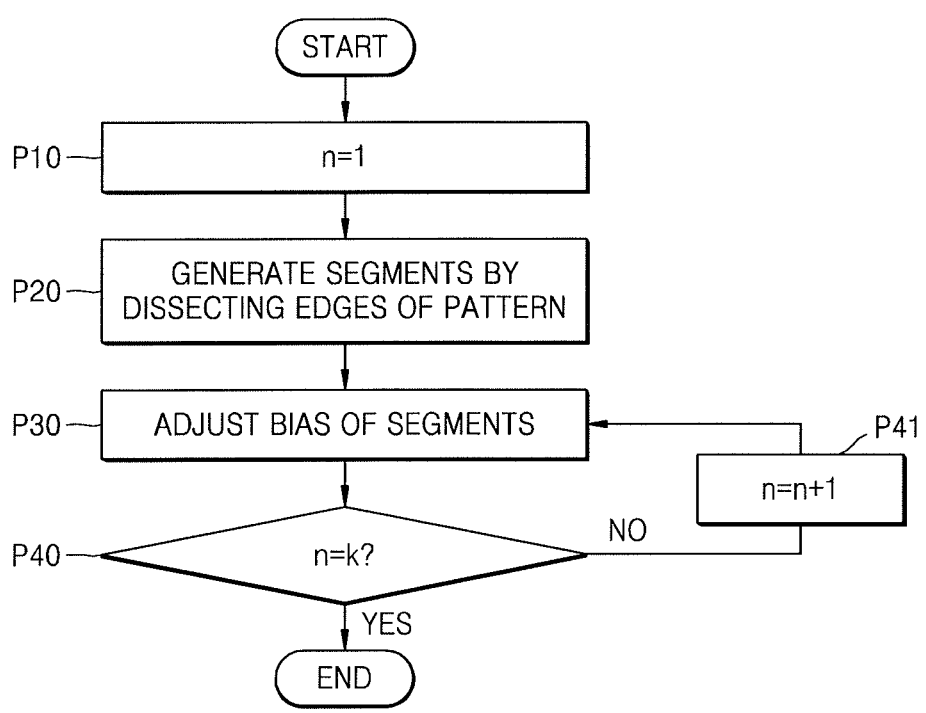
FIGS. 2 and 3 illustrate flowcharts of an OPC method according to some embodiments.

FIG. 2 is a flowchart of an OPC method according to some embodiments.

Herein, the OPC method is correcting a design layout of a lithographic mask by considering an optical proximity effect (OPE) according to high integration of a pattern, such that a pattern implemented on a circuit is similar to a designed pattern. The OPE may include, e.g., flare and aberration.

Flare indicates scattering of light. Flare is divided into global flare by light scattered on a rough surface of a lens element and local flare by light scattered by an adjacent pattern. When flare occurs, a non-intended change occurs in local/global exposure intensity, and thus, an implemented pattern is distorted.

Aberration is a concept including a difference in the intensity and phase of light and indicates a difference between a reference spherical surface having an image point as the center and a wave front after passing through an optical system. Aberration may occur by an optical path difference between an ideal wave front and a wave front after passing through an optical system. When the maximum value of an aberration amount is less than ¼ wavelength, it may be considered that a phase does not have a large difference from a case where aberration does not occur, and this is called Rayleigh's tolerance. Aberration exceeding the Rayleigh's tolerance may cause distortion on a pattern implemented by exposure. A slit used in an EUV exposure process may not have a rectangular structure but have an arc-shaped curved structure. Because the slit has a curved structure, an azimuth of light having passed through the slit varies according to a portion of the slit. This difference in the azimuth according to a position of the slit may cause aberration on the light having passed through the slit.

The OPC may be any one of rule-based OPC or model-based OPC.

The rule-based OPC is a scheme of determining an OPC rule based on a difference between a pattern transferred to a test substrate and a designed pattern. A test mask pattern is produced, and the test mask pattern is transferred to a semiconductor substrate to produce a test substrate. Thereafter, a design rule for determining bias data to be applied to design data of a mask pattern is determined based on measurement data of a pattern formed on the semiconductor substrate and design data of a test mask. Once the design rule is determined, the mask pattern is corrected based on the determined design rule. The correction may be performed in a layout computer aided design (CAD) step of the mask pattern. According to the rule-based OPC, a test pattern is measured for all patterns allowed in a design, and a work is repeated every time a process is changed, and thus, a lot of time and costs may be consumed.

The model-based OPC may be performed through a simulation using a process model including a kernel, the process model being formed through a simulation. Kernels representing a transfer process in consideration of the OPE are generated based on a measurement result and/or a simulation result for a test pattern. A difference between a shape of a mask pattern and a shape of a pattern transferred to a semiconductor substrate is obtained through a process model including the kernels, and the mask pattern is corrected according to the simulation result. The model-based OPC does not need to measure a number of test patterns, and thus, a process time and costs may be saved.

Referring to FIG. 2, performing the OPC may include generating segments by dissecting edges of a pattern (P20), and adjusting a bias of the segments (P30), wherein the bias of the segments may be adjusted a plurality of times. For example, dissecting edges of a pattern may refer to dividing an edge of a layout of a target pattern into fragments, e.g., the layout may be a layout of a mask pattern to be formed on the mask and be transferred to the substrate during an exposure process. In operation P10, n denotes an ordinal for indicating a count of bias adjustment, and n=1 indicates that segment bias adjustment is first performed.

The segment generation in operation P20 will be described below in detail with reference to FIGS. 3 to 12.

The segment bias adjustment in operation P30 indicates adjusting a position of a segment of a first provided design layout or adjusting the position of the segment based on a position of the segment changed according to previous bias adjustment. For example, according to a bias of a segment, the segment may be away from the center of a pattern so as to increase a linewidth of the pattern or close to the center of the pattern so as to decrease the linewidth of the pattern.

In operation P40, when a bias of segments is adjusted by an initially set count k (n=k), the OPC may end. When the number of times of segment bias adjustment is less than the initially set count k, a process of adjusting a bias of segments in a next round (n=n+1) may be performed through operation P41.

Figure 3:
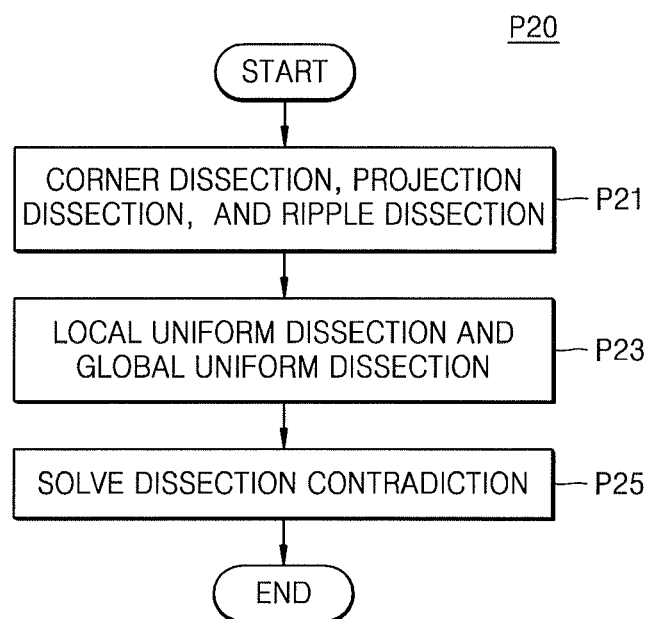

Hereinafter, operation P20 will be described in detail with reference to FIGS. 3 to 12. FIG. 3 is a flowchart of operation P20 in an OPC method according to some embodiments.

FIGS. 4 to 12 are layout diagrams for describing the OPC method according to some embodiments.

Referring to FIG. 3, generation of the segments by dissecting the edges (P20) may include corner dissection, projection dissection, and ripple dissection (P21), local uniform dissection and global uniform dissection (P23), and dissection contradiction solving (P25).

Figure 4:
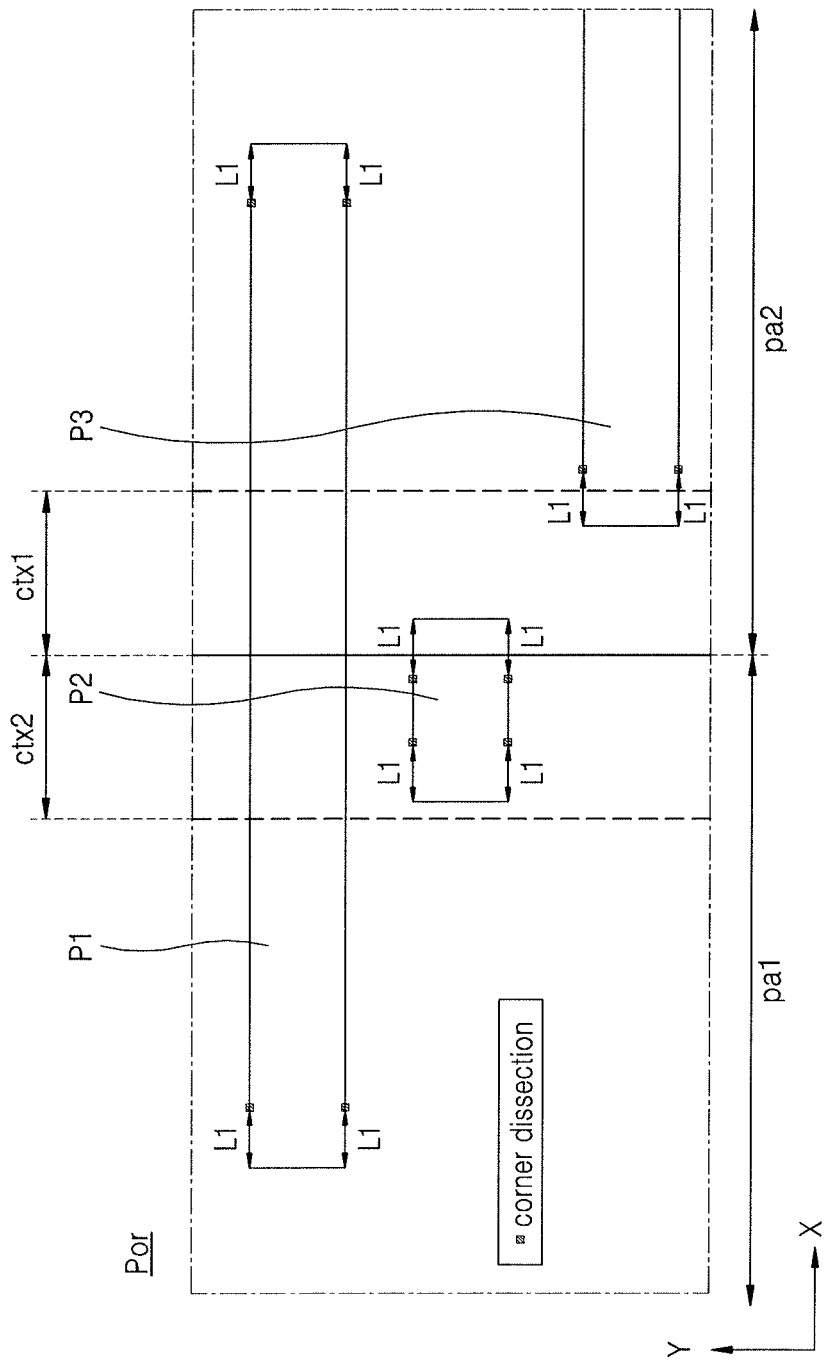
FIGS. 4 to 12 illustrate layout diagrams for describing an OPC method according to some embodiments.

In detail, referring to FIGS. 3 and 4, the generation of segments by dissecting the edges (P20) may include corner dissection (P21) by determining positions spaced apart by a first length L1 from vertexes of each pattern as corner dissection positions. In FIG. 4 and the drawings to be referred to hereinafter, corner dissection positions determined by corner dissection are indicated by rectangular dots with a hatched pattern. For example, as illustrated in FIG. 4, four corner dissection positions may be set in the first pattern P1, so each corner dissection position is spaced apart by a distance L1 from a corresponding corner of the first pattern P1 along an edge of the first pattern P1. Although FIG. 4 shows for convenience of description that the corner dissection positions are determined in the X direction from each of the vertexes of the first to third patterns P1, P2, and P3, the corner dissection positions may be determined in the Y direction likewise.

Figure 5:
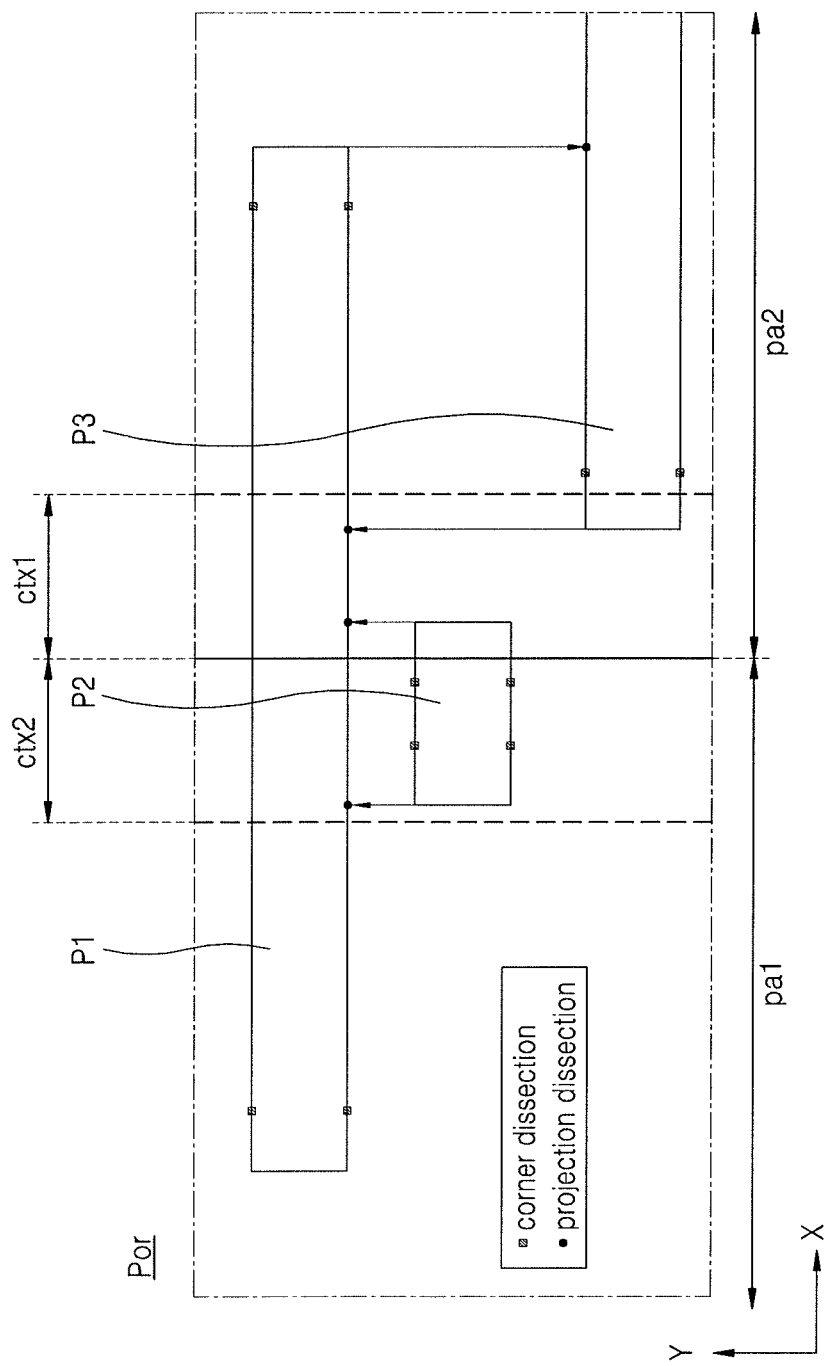

Referring to FIGS. 3 and 5, the generation of the segments by dissecting the edges (P20) may include projection dissection (P21) by determining positions where an extension line starting from any one vertex of the first to third patterns P1, P2, and P3 and being in parallel to any one of the X and Y directions meets an edge of the other one of the first to third patterns P1, P2, and P3. In FIG. 5 and the drawings to be referred to hereinafter, the projection dissection positions determined by the projection dissection are indicated by solid circular dots. For example, as illustrated in FIG. 4, extension lines may extend from opposite sides of the second pattern P2 along the Y direction toward the first pattern P1, so projection dissection positions are set along an edge of the first pattern P1 at intersection points of the extension lines with the first pattern P1.

Although FIG. 5 shows that projection dissection positions are determined on only an edge adjacent to the second pattern P2 among the edges of the first pattern P1, which are parallel to the X direction, the present embodiment is not limited thereto. For example, projection dissection positions may be determined on an edge spaced apart to be farther from the second pattern P2 among the edges of the first pattern P1, which are parallel to the X direction.

Figure 6:
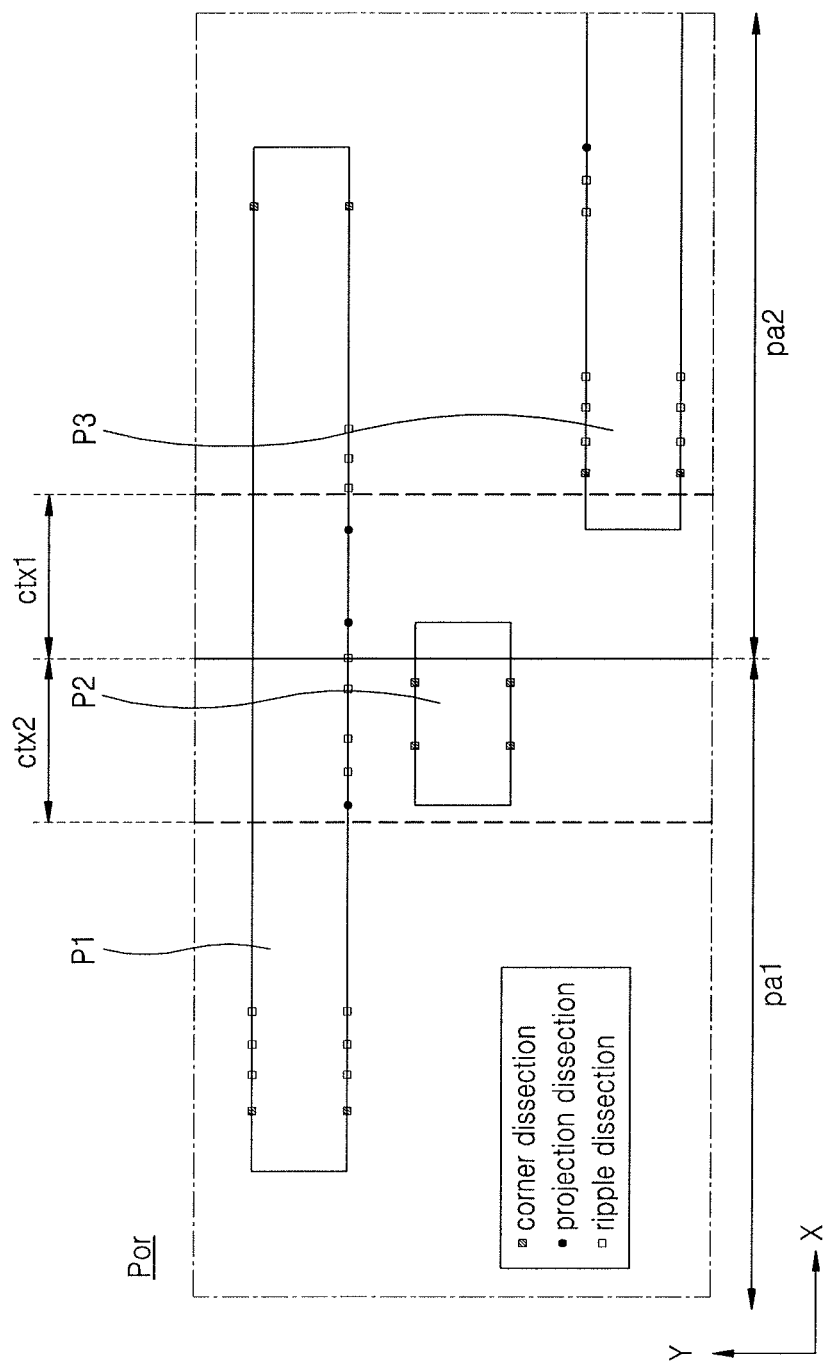

Referring to FIGS. 3 and 6, the generation of the segments by dissecting the edges (P20) may include ripple dissection (P21) to prevent ripples at the edges of the patterns. Herein, the ripple indicates a phenomenon that an edge of a pattern is meandering in a wave shape. A width of the pattern may increase or decrease by the occurrence of the ripple. The ripple may occur at an edge near a vertex or an edge of another pattern adjacent to the vertex.

The ripple dissection may be to adjust a bias of segments in a direction opposite to a change in a linewidth according to occurrence of a ripple, e.g., virtually dividing or setting portions of patterns to adjust for potential shifting. For example, a bias of segments of a part where a decrease in a width of a pattern is predicted may be adjusted such that the width of the pattern increases. On the contrary, a bias of segments of a part where an increase in a width of a pattern is predicted may be adjusted such that the width of the pattern decreases. In FIG. 6 and the drawings to be referred to hereinafter, the ripple dissection positions determined by the ripple dissection are indicated by hollow rectangular dots.

Although FIGS. 4 to 6 show that operation P21 is performed in the order of the corner dissection, the projection dissection, and the ripple dissection, this is for convenience of description and does not limit embodiments. The corner dissection, the projection dissection, and the ripple dissection may be performed in a random order or substantially at the same time.

Thereafter, in operation P23, local uniform dissection and global uniform dissection may be performed.

Figure 7A:
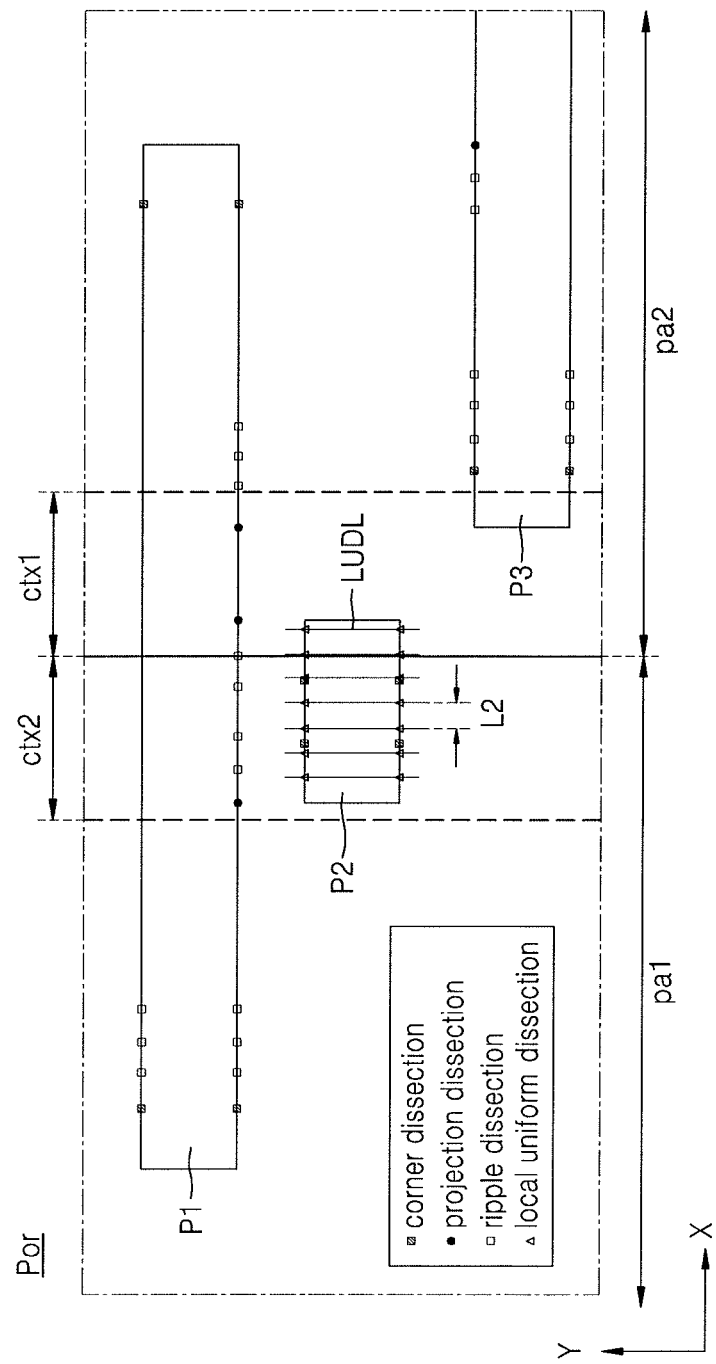
Figure 7B:
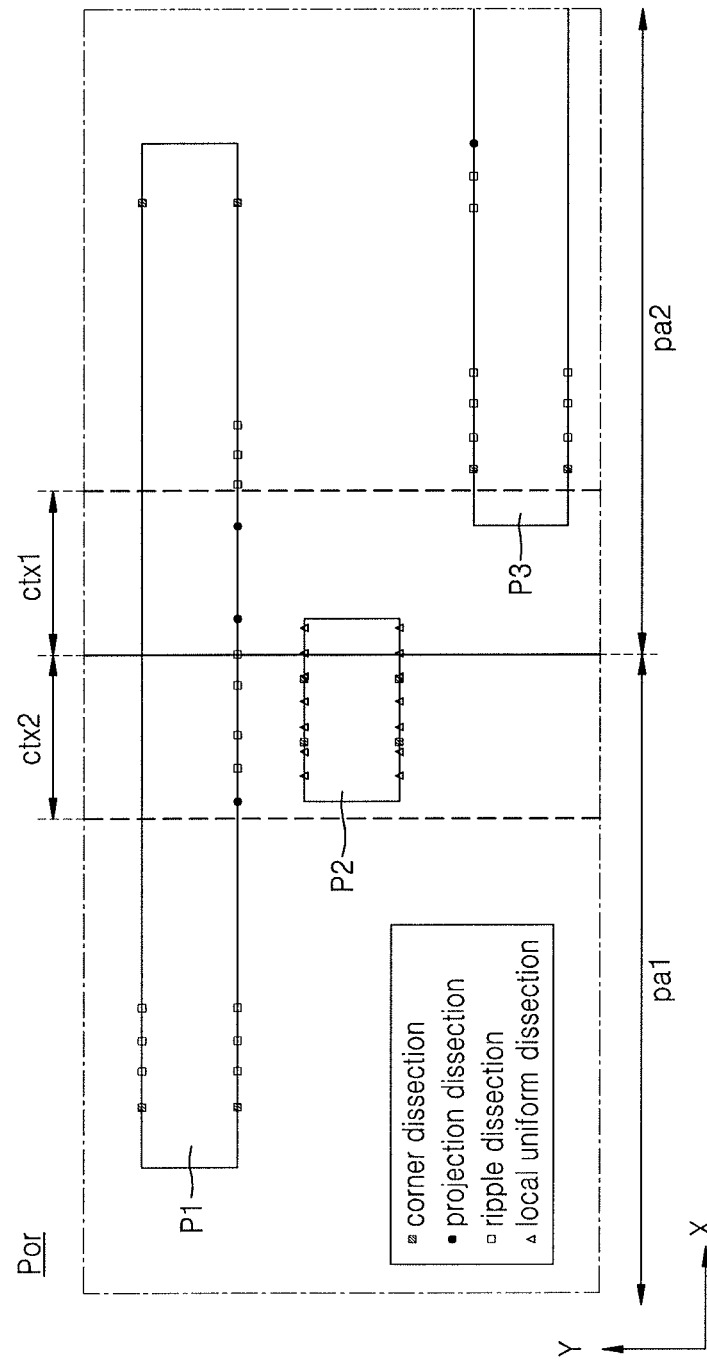

Referring to FIGS. 3, 7A, and 7B, the local uniform dissection may be uniform dissection based on local coordinates.

To describe the local uniform dissection, local uniform dissection lines LUDL that are virtual parallel lines are shown in FIG. 7A but are not shown in FIG. 7B, e.g., the local uniform dissection lines LUDL may be imaginary lines at equal intervals within each pattern that has a critical length. According to some embodiments, patterns less than a critical length may be dissected by the local uniform dissection. For example, as illustrated in FIG. 7A, the local uniform dissection may be applied to the second pattern P2 that is less than the critical length but may not be applied to the first and third patterns P1 and P3 that are greater than the critical length. According to some embodiments, by distinguishing local uniform dissection targets from global uniform dissection targets to be described below based on a set critical length, a separate computation process for determining the local uniform dissection targets and global uniform dissection targets is not necessary, and thus, OPC reliability may be improved without decreasing an OPC speed.

Herein, uniform dissection indicates that an edge of a pattern is dissected at equal intervals, and a local coordinate system may be a coordinate system having, as the origin, any one of vertexes of each pattern. That is, the local uniform dissection may determine points of intersection between the local uniform dissection lines LUDL as local uniform dissection positions. The local uniform dissection lines LUDL are a plurality of parallel lines spaced apart by a second length L2 from each other by defining any one of vertexes of each pattern as the origin and edges of the pattern. In FIGS. 7A and 7B and the drawings to be referred to hereinafter, the local uniform dissection positions are indicated by hollow triangular dots.

Figure 8A:
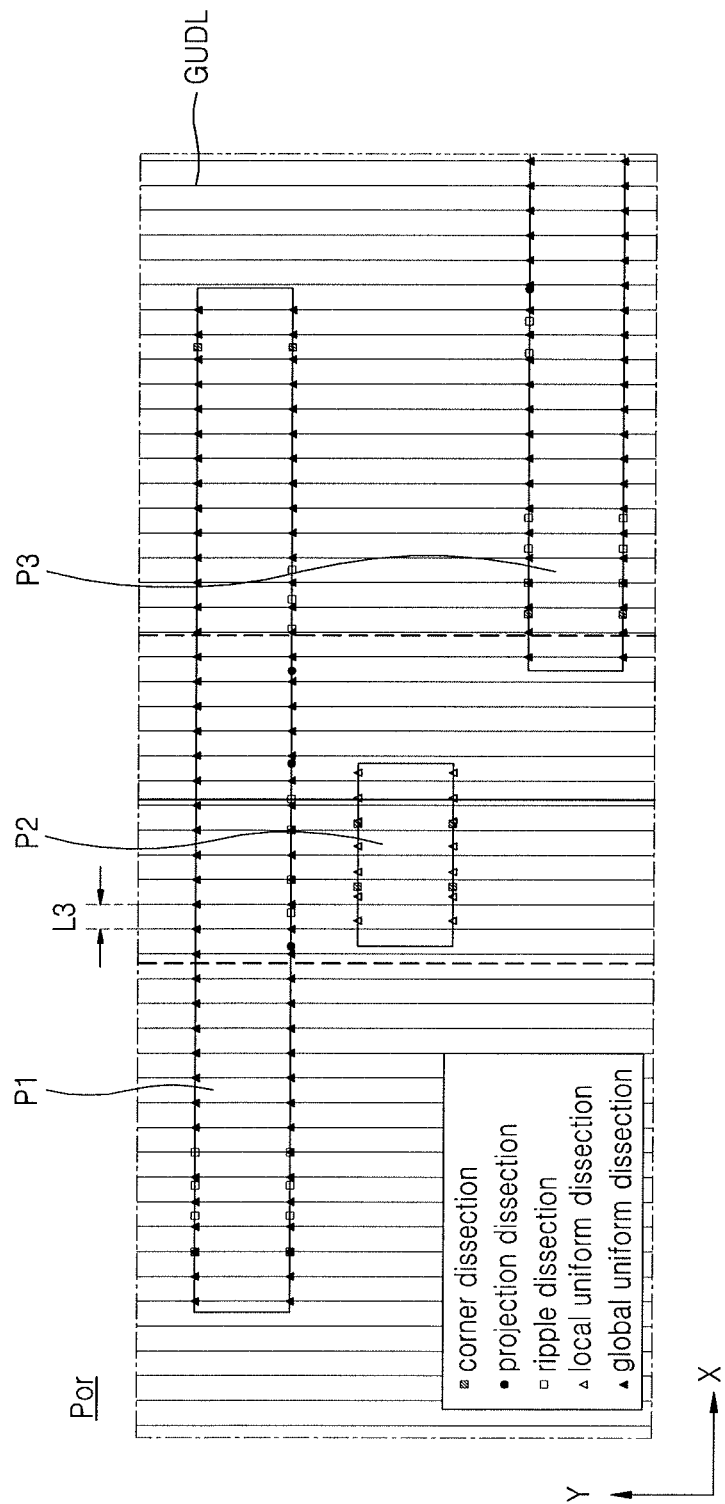

Referring to FIGS. 3 and 8A, the global uniform dissection may be uniform dissection based on a global coordinate system.

Figure 8B:
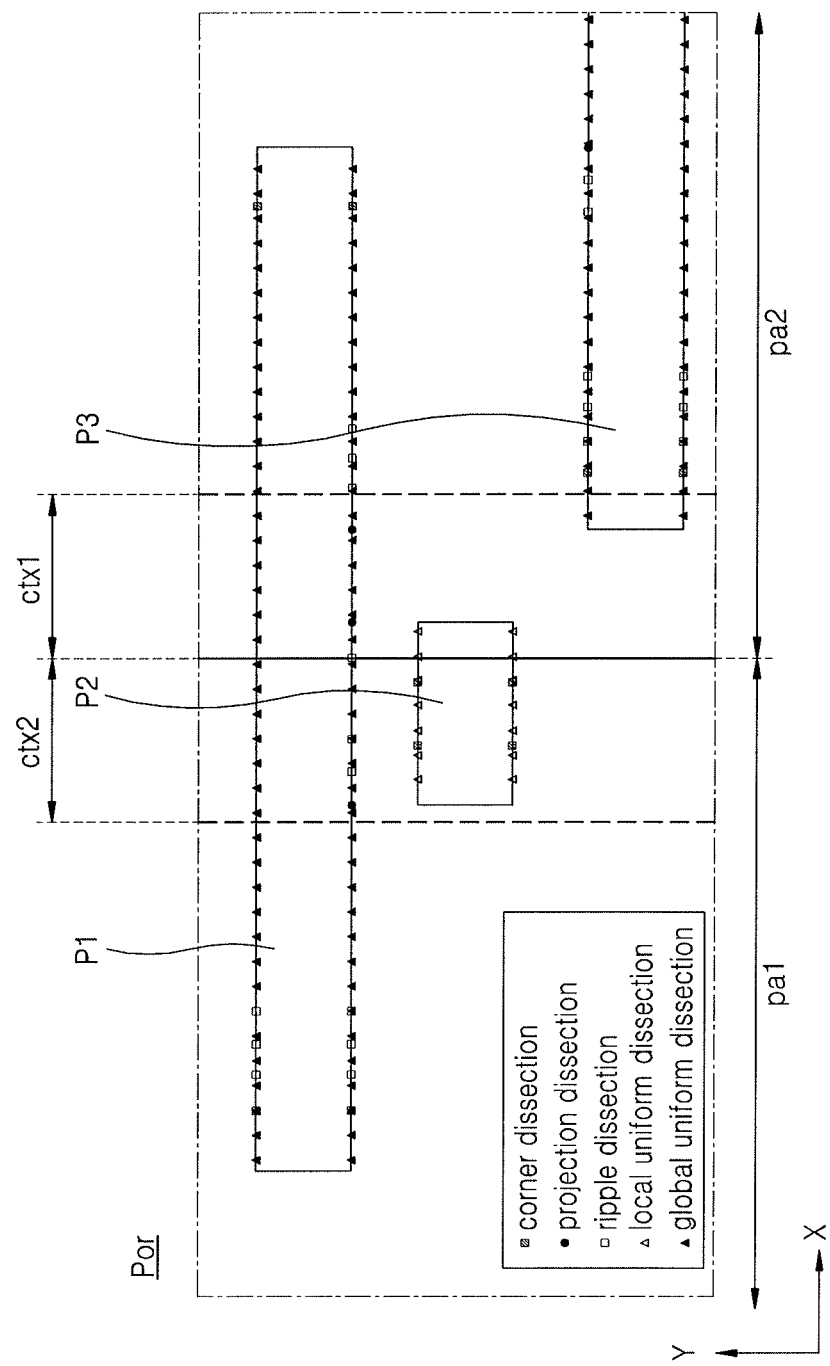

Like in FIGS. 7A and 7B, global uniform dissection lines GUDL that are virtual parallel lines are shown in FIG. 8A but are not shown in FIG. 8B, e.g., the global uniform dissection lines GUDL may be imaginary lines at equal intervals that intersect the entire full shot FS. Unlike local coordinate systems defined differently for each pattern to have different origins, the global coordinate system may be common to the whole full shot FS (see FIG. 1A) (and patches included in the full shot FS). According to some embodiments, the global coordinate system may have any one of vertexes of the full shot FS (see FIG. 1A) or the center of the full shot FS (see FIG. 1A) as the origin but is not limited thereto. Accordingly, unlike the local uniform dissection in which a reference point of uniform dissection is different for each pattern, in the global uniform dissection, a reference point of uniform dissection may be identical for all patterns that are targets of the global uniform dissection.

That is, the global uniform dissection determines points of intersection between the global uniform dissection lines GUDL and the patterns therein as global uniform dissection positions. The global uniform dissection lines GUDL are a plurality of parallel lines spaced apart by a third length L3 from each other based on the origin of the global coordinate system.

According to some embodiments, the third length L3 may be substantially the same as the second length L2 (see FIG. 7A). According to some other embodiments, the third length L3 may be less or greater than the second length L2 (see FIG. 7A).

In FIGS. 8A and 8B and the drawings to be referred to hereinafter, the global uniform dissection positions are indicated by solid triangular dots. For the patterns to which the global uniform dissection is applied, X coordinates of uniform dissection positions corresponding to any one of the same global uniform dissection lines GUDL may be identical. In the example shown in FIGS. 8A and 8B, the global uniform dissection may be applied to the first and third patterns P1 and P3 greater than or equal to the critical length and may not applied to the second pattern P2 less than or equal to the critical length.

In existing OPC, when a segment is generated, local uniform dissection based on a local coordinate system is performed for all patterns. Accordingly, when a larger pattern extends across a boundary, e.g., when the first pattern P1 extends from the first patch pa1 to the second patch pa2 and from the first and second background regions ctx1 and ctx2 to the outside thereof, different local coordinate systems are used to generate segments for each of the different sides of the boundary, e.g., different segments for the first patch pa1 and the second patch pa2. Accordingly, local uniform dissection positions on the first pattern P1 recognized when the segment for the first patch pa1 is generated may differ from local uniform dissection positions on the first pattern P1 recognized when the segment for the second patch pa2 is generated, thereby causing violation in a mask rule including jog, notch, nub, and the like.

In contrast, according to embodiments, by performing global uniform dissection using a global coordinate system instead of a local coordinate system for a pattern such as the first pattern P1, even when the first pattern P1 recognized when the segment for the first patch pa1 is generated differs from the first pattern P1 recognized when the segment for the second patch pa2 is generated, uniform dissection positions of the first pattern P1 may be identical. Accordingly, a problem according to a difference in uniform dissection positions of patterns extending at a boundary may be solved.

Although FIGS. 7A to 8B show that the local uniform dissection is first performed and then the global uniform dissection is performed, this is for convenience of drawing and does not limit embodiments. For example, the local uniform dissection and the global uniform dissection may be performed substantially at the same time or in a random order. Likewise, operations P21 and P23 may be performed in a random order or substantially at the same time.

Thereafter, in operation P25, dissection contradiction may be solved. Solving of the dissection contradiction may be a process for satisfying an upper limit and a lower limit for a length of a single segment. Operations P21 and P23 are to determine a dissection position candidate group that is a set of positions having the possibility of dissection positions, and in operation P25 of solving the dissection contradiction, dissection positions may be confirmed by excluding some dissection positions from the dissection position candidate group and adding other dissection positions to the dissection position candidate group. Accordingly, segments for performing OPC may be determined.

FIGS. 9A to 11D show a part of the first pattern P1 shown in FIG. 8B to describe operation P25 of solving the dissection contradiction.

Figure 9A:
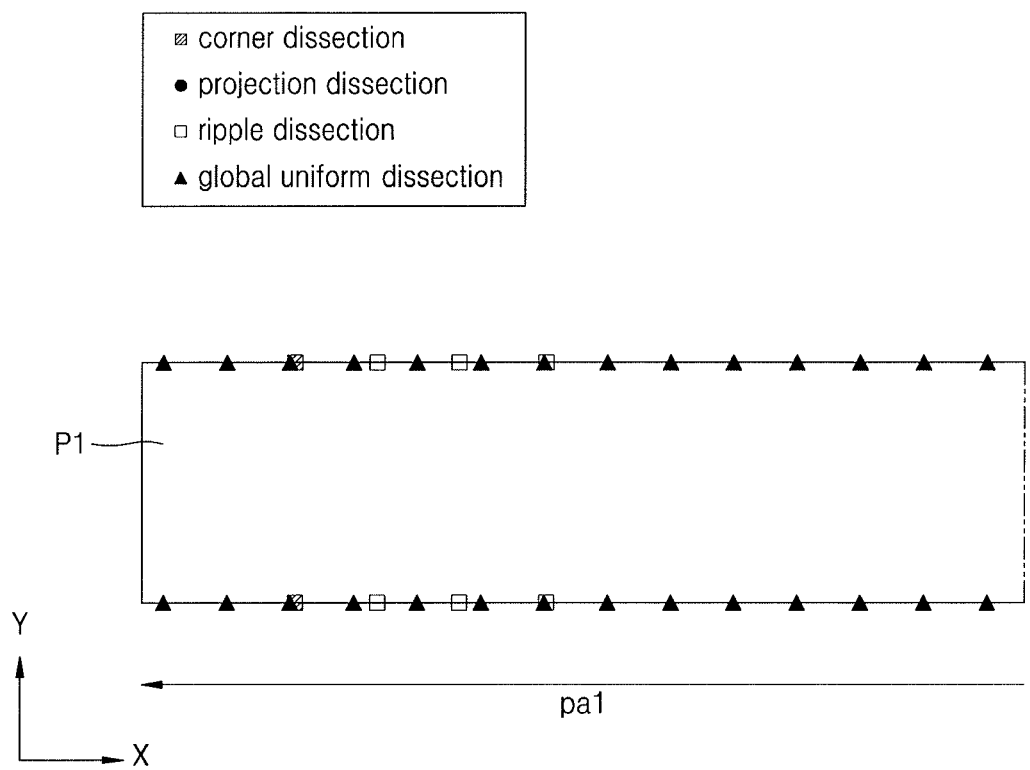
Figure 9B:
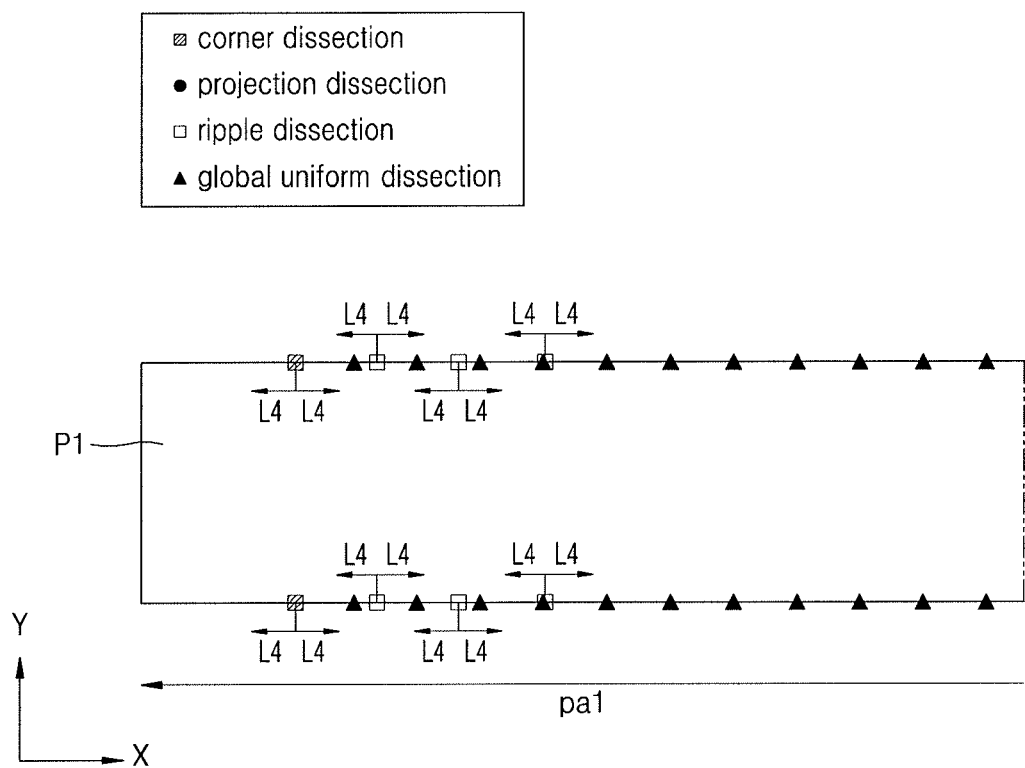
Figure 9C:
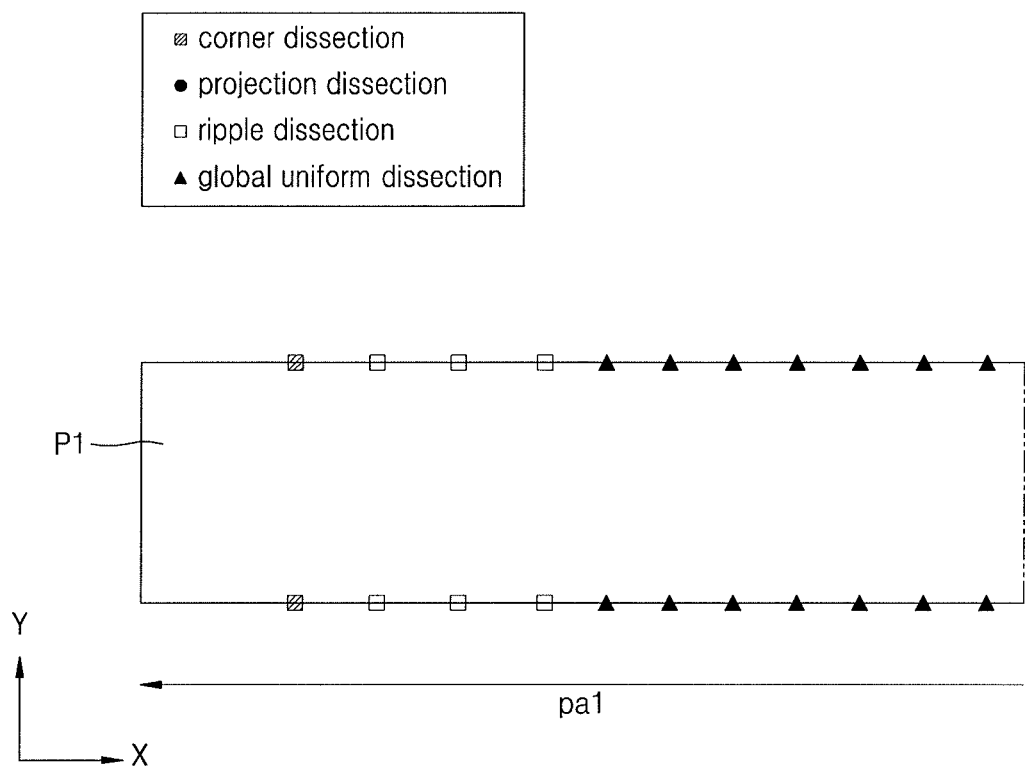
Figure 10A:
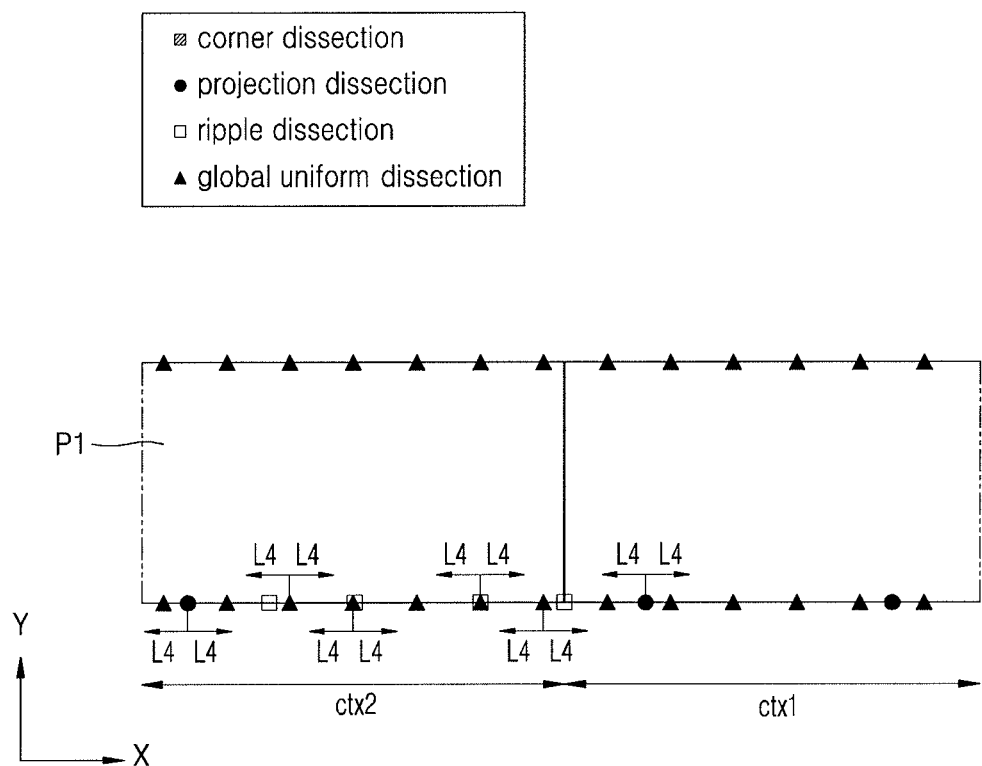
Figure 10B:
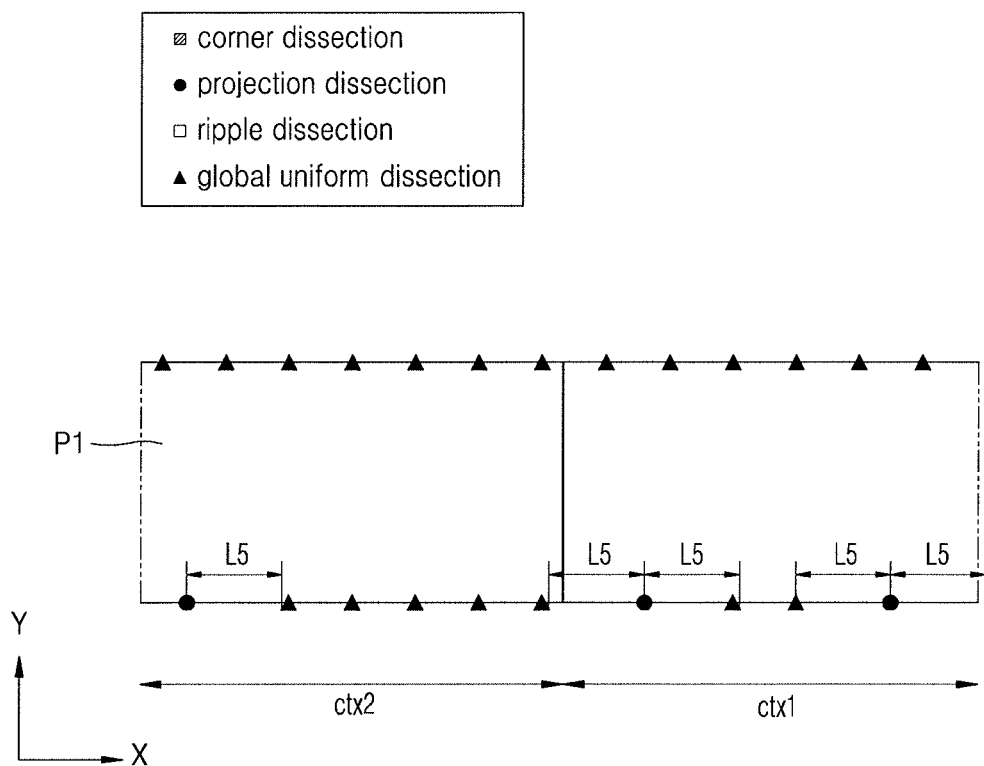
Figure 10C:
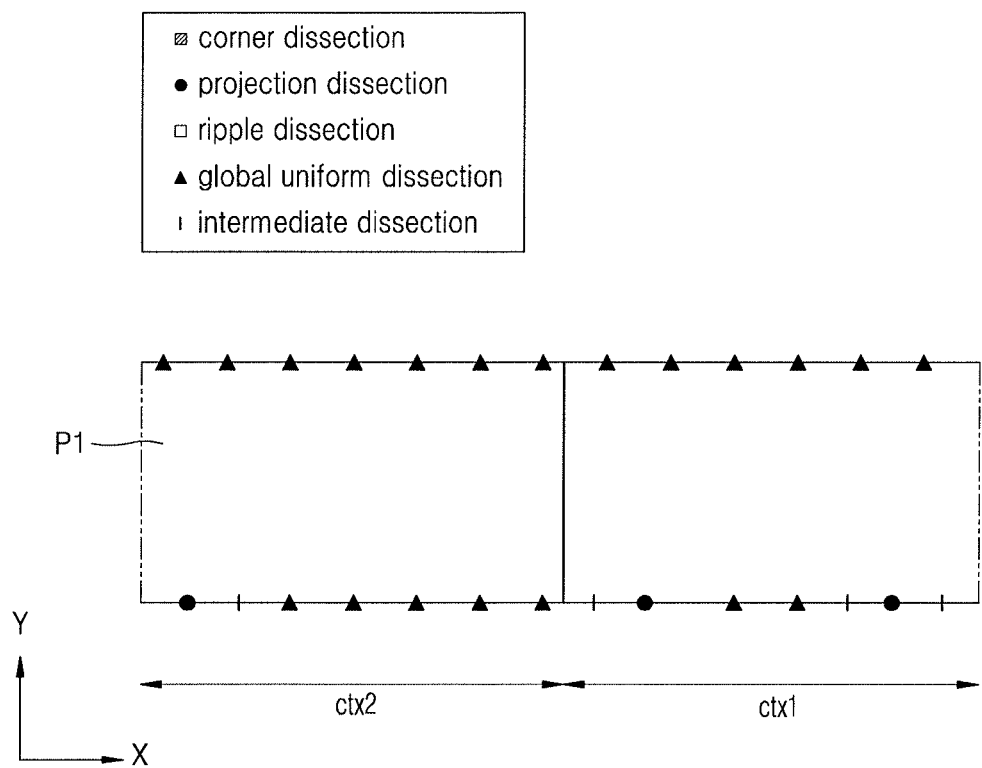

In more detail, FIGS. 9A to 9C show the first pattern P1 on the first patch pa1 outside the second background region ctx2. FIGS. 10A to 10C show the first pattern P1 on the first and second background regions ctx1 and ctx2. FIGS. 11A to 11D show the first pattern P1 on the second patch pa2 outside the first background region ctx1.

According to some embodiments, even for the first pattern P1 that is a single pattern, methods of solving contradiction on parts belonging to different regions may differ from each other. To solve dissection contradiction for a part of the first pattern P1 arranged inside the first and second background regions ctx1 and ctx2, global uniform dissection positions may be prioritized relative to ripple dissection positions. To solve dissection contradiction for parts of the first pattern P1 arranged outside the first and second background regions ctx1 and ctx2, ripple dissection positions may be prioritized relative to global uniform dissection positions.

Referring to FIGS. 9A and 9B, global uniform dissection positions arranged to be closer to a vertex than corner dissection positions may be excluded from the dissection position candidate group.

Thereafter, referring to FIGS. 9B and 9C, global uniform dissection positions spaced apart by a distance less than a fourth length L4 from corner dissection positions and ripple dissection positions may be excluded from the dissection position candidate group. That is, for the first pattern P1 on the first patch pa1 outside the second background region ctx2 (see FIG. 8B), corner dissection positions and ripple dissection positions may be prioritized relative to global uniform dissection positions. Herein, the fourth length L4 may be the lower limit of a single segment length.

FIG. 9C shows dissection positions after solving the dissection contradiction. The dissection positions may include corner dissection positions, projection dissection positions, ripple dissection positions, and global uniform dissection positions. A length of each segment defined by a line segment between neighboring dissection positions may satisfy the upper limit of a fifth length L5 (see FIG. 10C) and the lower limit of the fourth length L4.

Referring to FIGS. 10A and 10B, global uniform dissection positions spaced apart by the fourth length L4 or less in the X direction from projection dissection positions may be excluded from the dissection position candidate group. Ripple dissection positions spaced apart by the fourth length L4 (see FIG. 9B) or less in the X direction from global uniform dissection positions may be excluded from the dissection position candidate group.

Referring to FIGS. 10B and 10C, when a distance between neighboring dissection positions is the fifth length L5 or more, center points of the neighboring dissection positions may be determined as intermediate dissection positions. That is, when a length of a single segment is the fifth length L5 or more, the single segment may be equally divided into two segments. In FIG. 10C and the drawings to be referred to hereinafter, the intermediate dissection positions are indicated by a short line segment intersecting edges of the first to third patterns P1, P2, and P3.

Herein, the fifth length L5 may be the upper limit of a single segment length. Accordingly, the length of each segment defined by a line segment between neighboring dissection positions may satisfy the upper limit of the fifth length L5 and the lower limit of the fourth length L4.

Figure 11A:
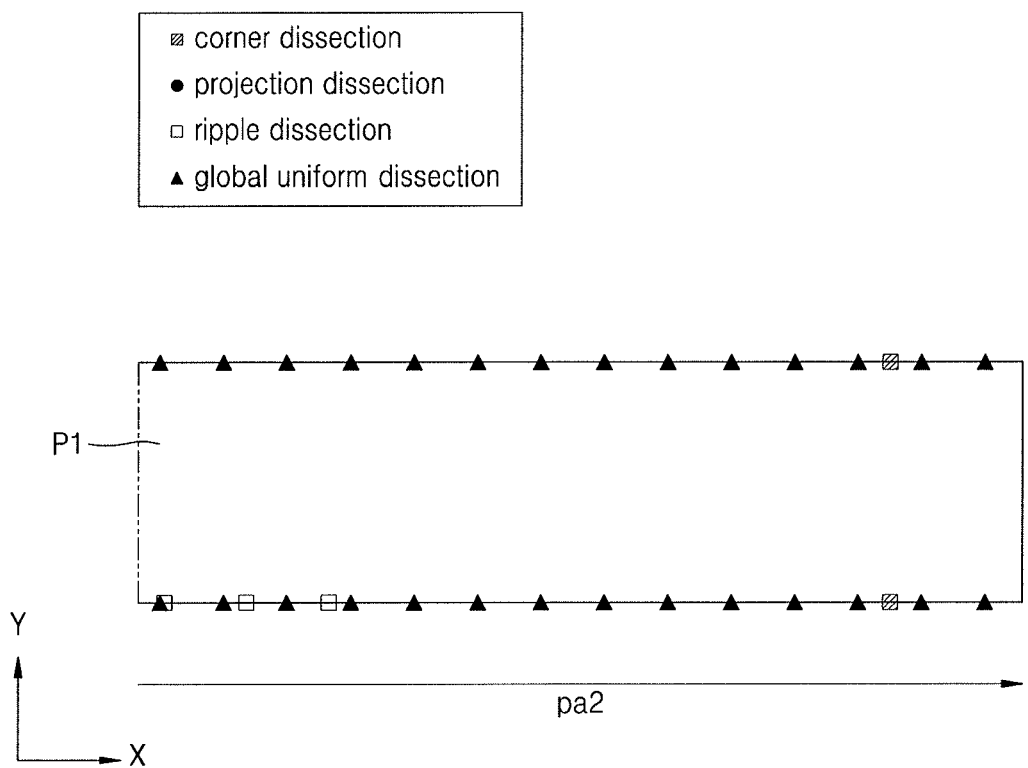
Figure 11B:
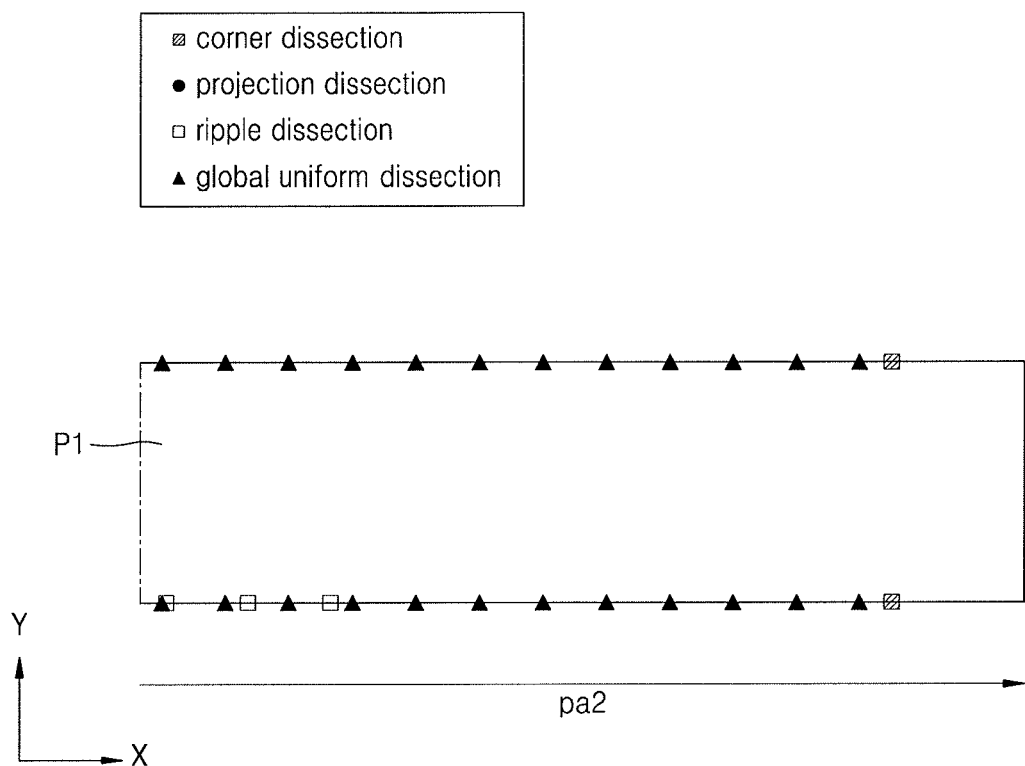

Referring to FIGS. 11A and 11B, dissection positions closer to a vertex than corner dissection positions may be excluded from the dissection position candidate group.

Figure 11C:
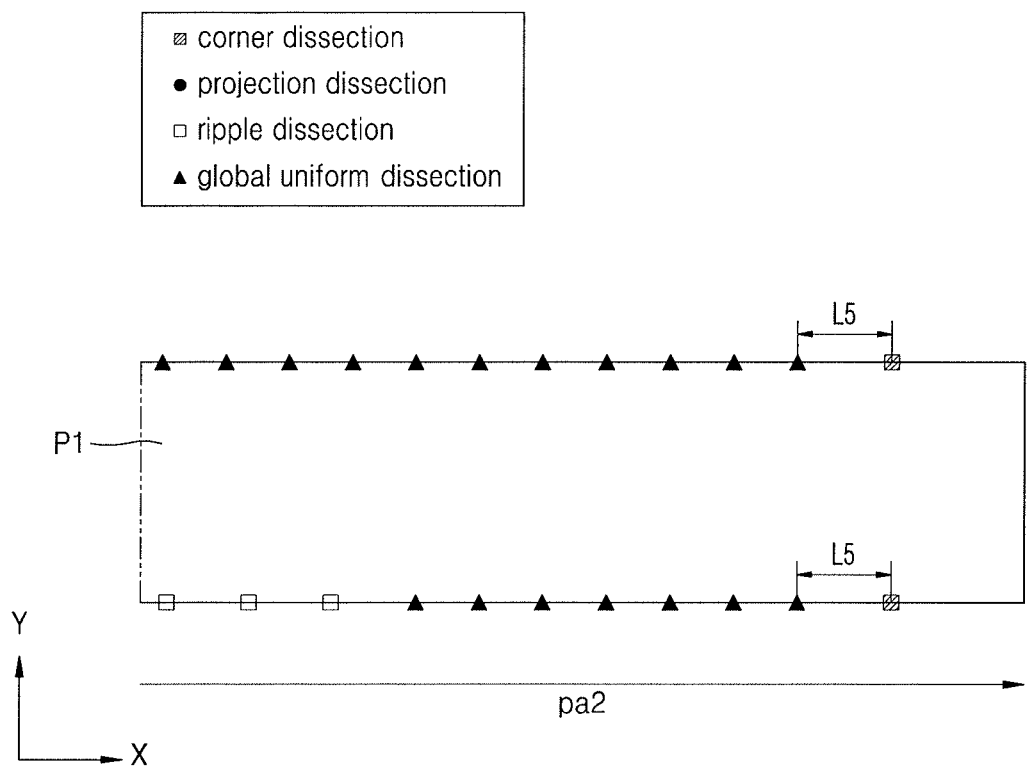

Referring to FIGS. 11B and 11C, global uniform dissection positions spaced apart by the fourth length L4 or less in the X direction from ripple dissection positions and corner dissection positions may be excluded from the dissection position candidate group.

Figure 11D:
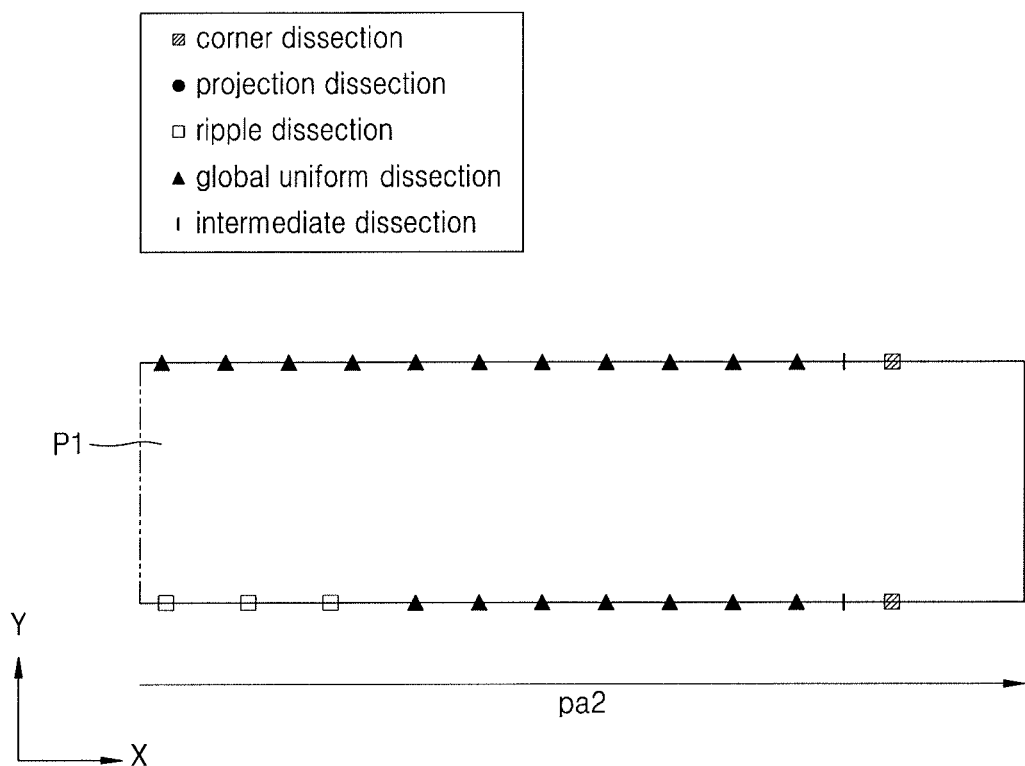

Referring to FIGS. 11C and 11D, when a length of a single segment is the fifth length L5 or more, the single segment may be equally divided by an intermediate dissection position.

Figure 12:
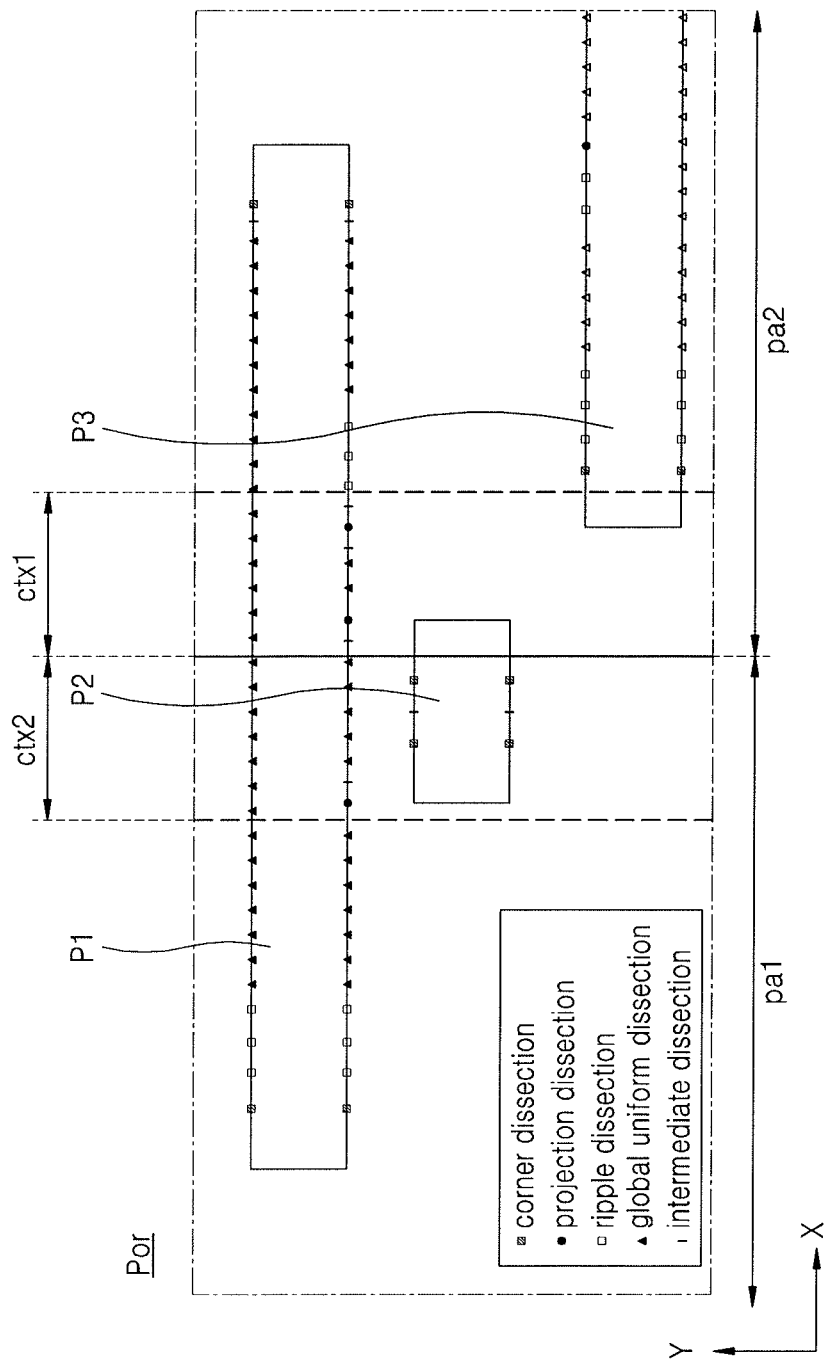

FIG. 12 shows a final dissection result obtained by also applying, to the second and third patterns P2 and P3, the segment dissection operations described with reference to FIGS. 9A to 11D.

Referring to FIG. 12, the same operations described with reference to FIGS. 9A to 11D may be applied to the second and third patterns P2 and P3.

Figure 13:
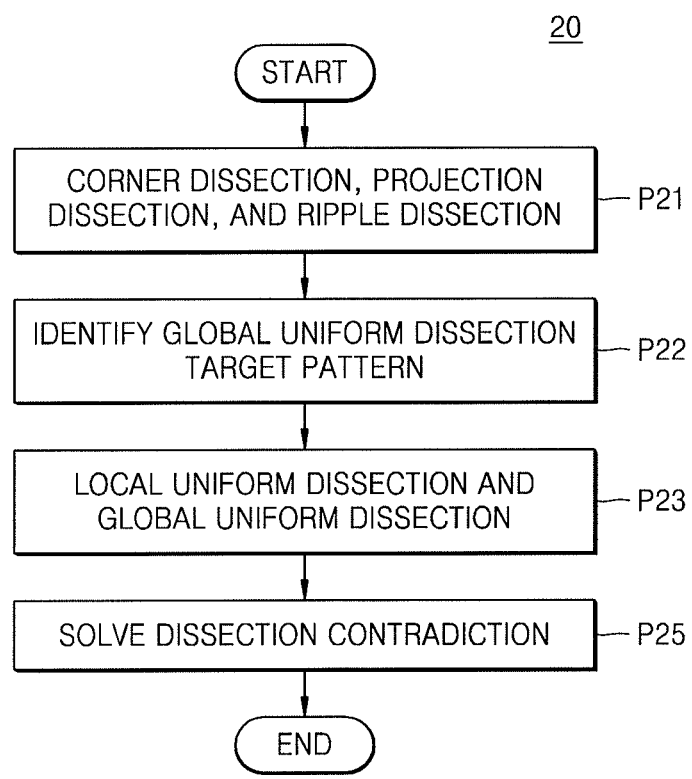
FIG. 13 illustrates a flowchart of an OPC method according to other some embodiments.

FIG. 13 is a flowchart of an OPC method according to other embodiments.

Figure 14:
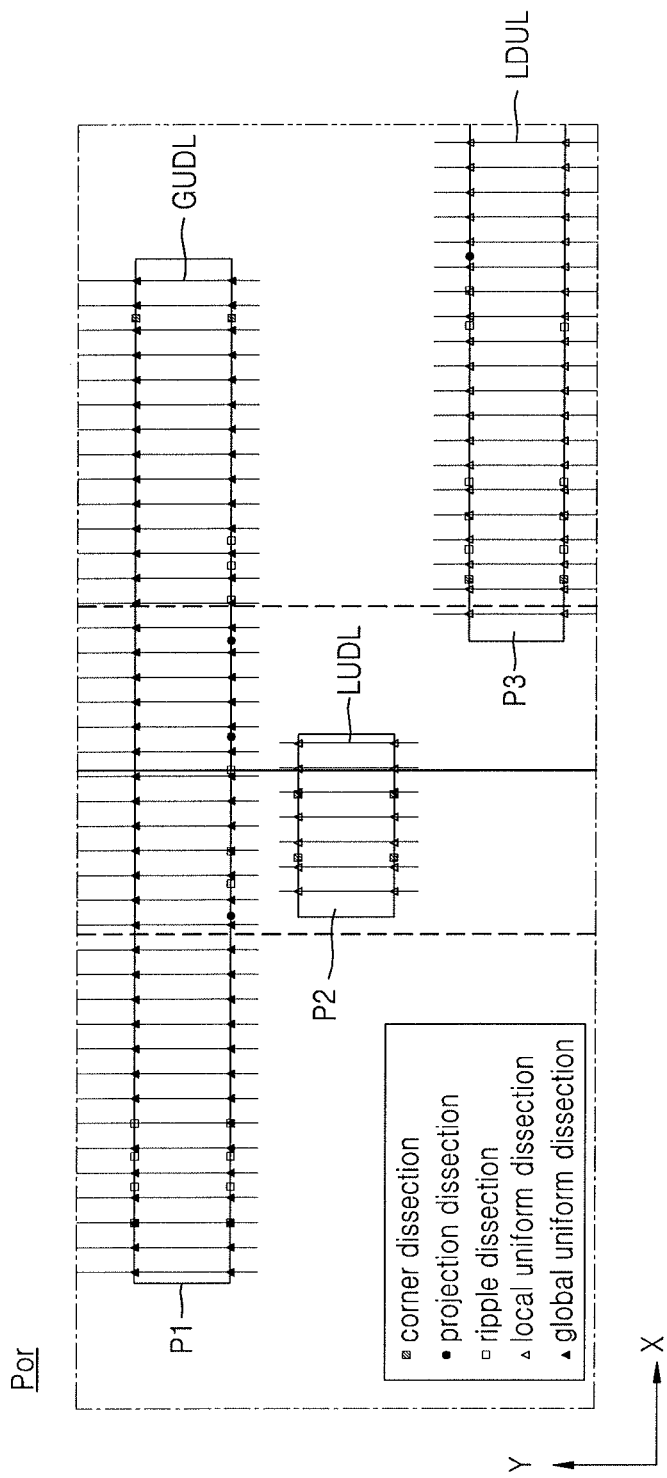
FIGS. 14 and 15 illustrate layout diagrams for describing an OPC method according to other embodiments.
Figure 15:
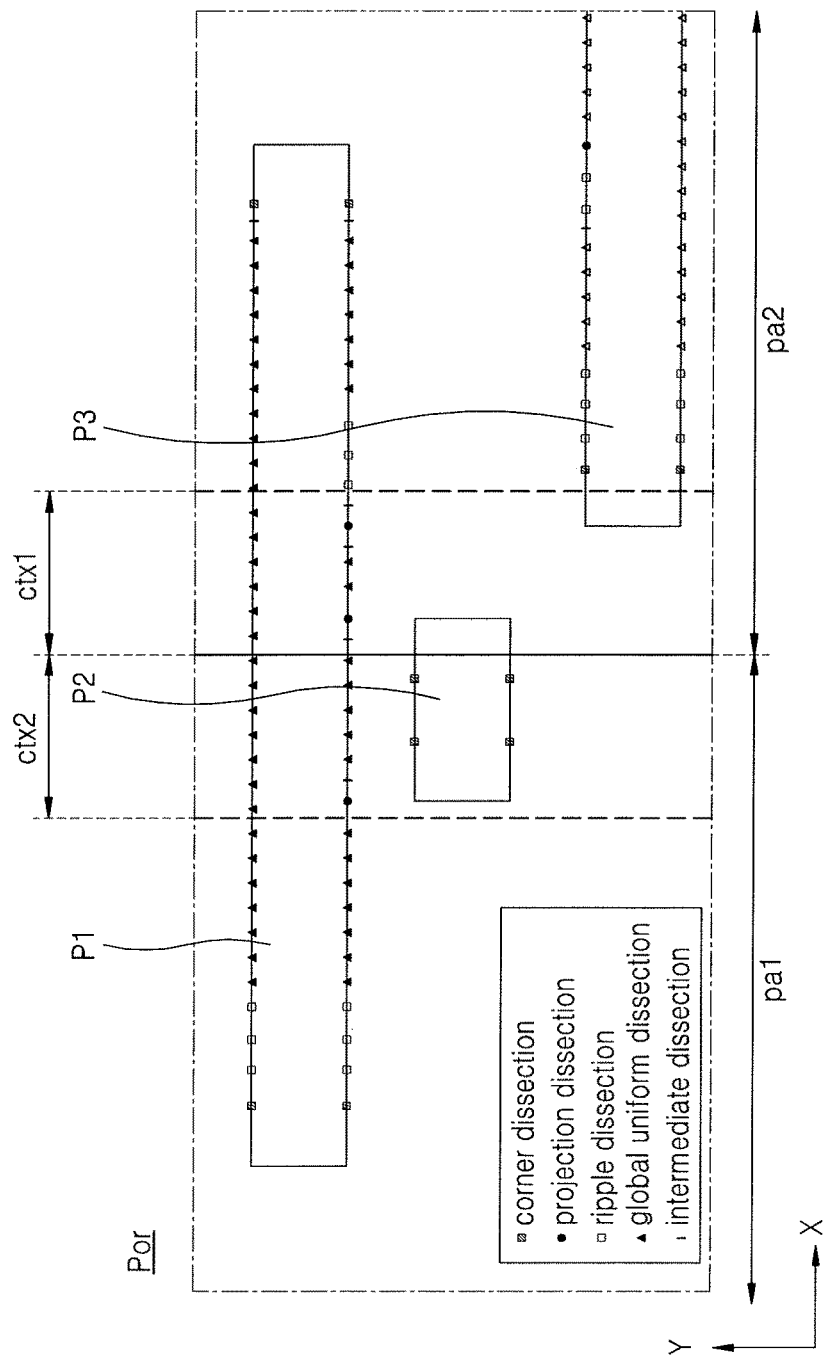

FIGS. 14 and 15 are layout diagrams for describing the OPC method according to other embodiments. For convenience of description, the description made with reference to FIGS. 3 to 12 is not repeated, and a difference therefrom will be mainly described.

Referring to FIGS. 13 and 14, compared to FIG. 3, FIG. 13 may further include identifying a global uniform dissection target pattern (P22).

According to example embodiments, the global uniform dissection target pattern may extend on both the first and second patches pa1 and pa2. According to example embodiments, the global uniform dissection target pattern may be determined by each of boundaries of the first and second background regions ctx1 and ctx2. According to example embodiments, a pattern intersecting each of boundaries of the first background region ctx1, which are parallel to the Y direction, may be a global uniform dissection target. According to example embodiments, a pattern (e.g., the first pattern P1) intersecting each of boundaries of the second background region ctx2, which are parallel to the Y direction, may be a global uniform dissection target.

According to example embodiments, when a pattern extends from the first patch pa1 outside the second background region ctx2 to the second patch pa2, the pattern may be a global uniform dissection target. Likewise, when a pattern extends from the second patch pa2 outside the first background region ctx1 to the first patch pa1, the pattern may be a global uniform dissection target.

In addition, for example, patterns extending only on the first and second background regions ctx1 and ctx2, extending only on the first patch pa1, or extending only on the second patch pa2 may be determined as local uniform dissection target patterns.

According to some embodiments, because the first pattern P1 starts from the first patch pa1 outside the second background region ctx2 and extends to the first background region ctx1, a local coordinate system of the first pattern P1 recognized when a segment of the first patch pa1 is generated may differ from a local coordinate system of the first pattern P1 recognized when a segment of the second patch pa2 is generated. Accordingly, the first pattern P1 may be a global uniform dissection target pattern.

According to some embodiments, because the second pattern extends only on the first and second background regions ctx1 and ctx2, a local coordinate system of the second pattern P2 recognized when a segment of the first patch pa1 is generated may be substantially the same as a local coordinate system of the second pattern P2 recognized when a segment of the second patch pa2 is generated. Accordingly, the second pattern P2 may be a local uniform dissection target.

According to some embodiments, because the third pattern P3 extends only on the second patch pa2, a local coordinate system of the third pattern P3 recognized when a segment of the first patch pa1 is generated may be substantially the same as a local coordinate system of the third pattern P3 recognized when a segment of the second patch pa2 is generated. Accordingly, the third pattern P3 may be a local uniform dissection target.

In addition, even when a local coordinate system when a segment of the first patch pa1 is generated differs from a local coordinate system when a segment of the second patch pa2 is generated, a pattern arranged only on the first patch pa1 and a pattern (the third pattern P3) arranged only on the second patch pa2 does not have contradiction on an OPC performing result, and thus, the patterns may be local uniform dissection targets.

Thereafter, referring to FIGS. 13 and 15, like the description made with reference to FIG. 3, dissection contradiction may be solved in operation P25.

According to some embodiments, in the operation of solving dissection contradiction, corner dissection positions, projection dissection positions, and ripple dissection positions may be prioritized relative to local uniform dissection positions. Accordingly, local uniform dissection positions spaced apart by a distance less than the fourth length L4 from corner dissection positions, projection dissection positions, and ripple dissection positions may be excluded from the dissection position candidate group.

According to some embodiments, by selectively performing global uniform dissection only for a pattern (e.g. the first pattern P1) for which the global uniform dissection is necessary, the reliability of OPC performance may be improved.

Figure 16A:
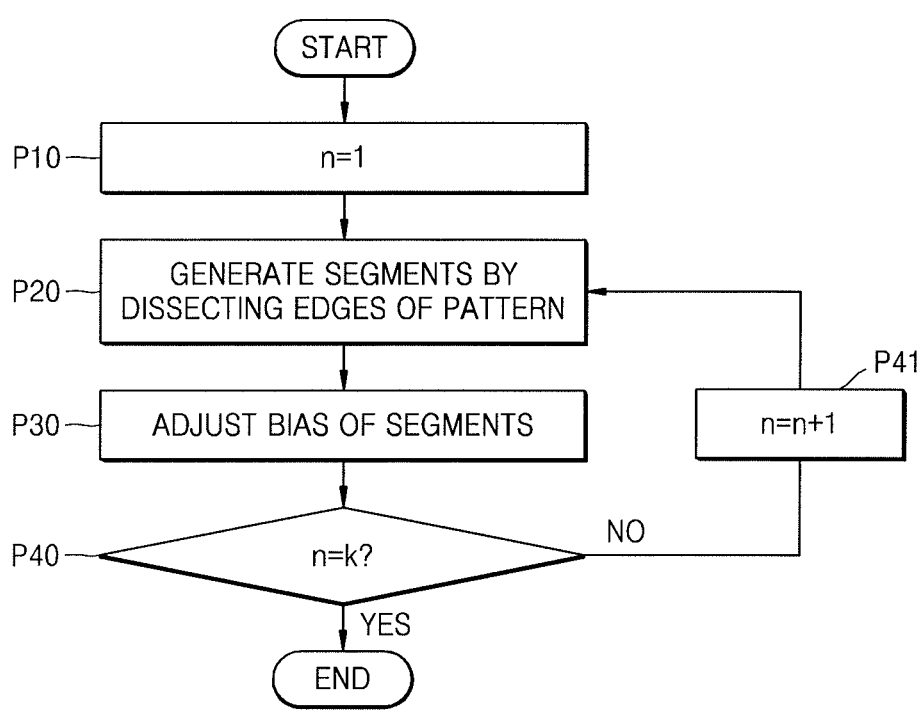
FIGS. 16A to 16C illustrate flowcharts of OPC methods according to other embodiments.
Figure 16B:
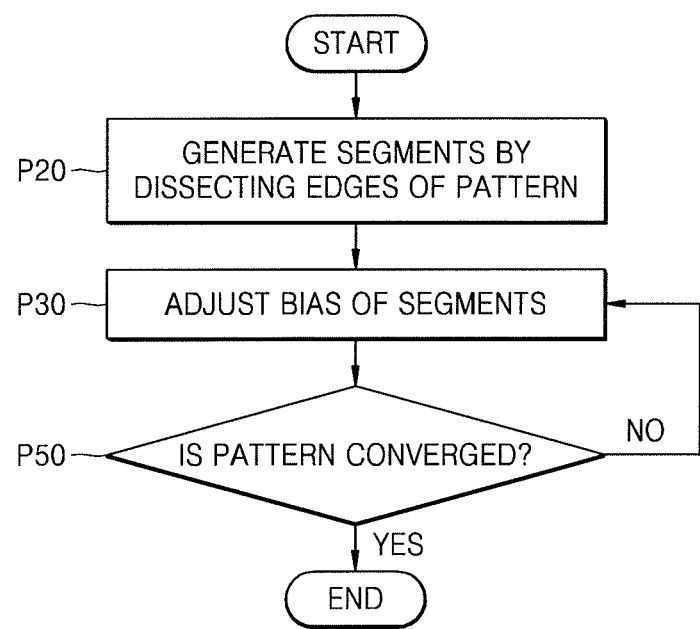
Figure 16C:
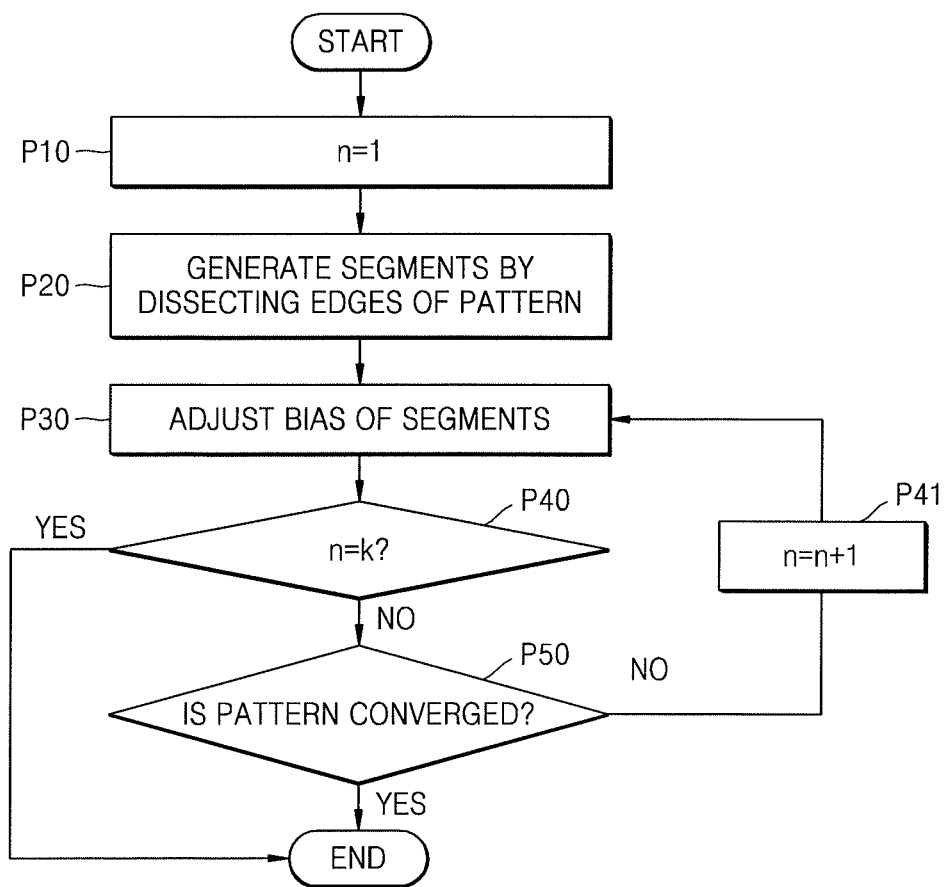

FIGS. 16A to 16C are flowcharts of OPC methods according to other some embodiments. For convenience of description, the description made with reference to FIGS. 2 to 12 is not repeated, and a difference therefrom will be mainly described.

Referring to FIG. 16A, unlike FIG. 2, when the number of OPC performance times is less than the set count k, the OPC method proceeds back to operation P20 to generate segments again, and in operation P30, a bias may be adjusted.

Referring to FIG. 16B, unlike FIG. 2, an OPC method may include a process of determining whether a pattern is converged (P50).

Operation P50 of determining whether a pattern is converged may include performing a simulation based on a design layout generated through OPC and checking whether a mask pattern obtained through the simulation coincides with a target mask pattern. According to some embodiments, OPC verification may include determining whether OPC has been appropriately performed, by using a simulation contour of a pattern.

According to some embodiments, when the simulation contour in the OPC verification is within an error tolerance (YES), the OPC method ends, and a subsequent process (e.g., mask rule check) may be performed. Herein, the error tolerance may have various values and may vary for each embodiment. According to some embodiments, when simulation data is substantially the same as a design layout, OPC may be performed. According to some embodiments, when the simulation contour in the OPC verification is outside the error tolerance (NO), the OPC method proceeds back to operation P30 to adjust a bias of segments again.

According to other example embodiments, unlike FIG. 16B, in operation P50, when the simulation contour in the OPC verification is outside the error tolerance (NO), the OPC method proceeds back to operation P20 to generate segments again and then adjust a bias of the segments in operation P30.

Referring to FIG. 16C, in addition to FIG. 2, the process in FIG. 16B of determining whether a pattern is converged (P50) may be further included.

In FIG. 16C, when approaching the set count (n=k) for performing OPC in operation P40, the OPC may end.

When the OPC is performed less than the set count (n=k) for performing the OPC in operation P40, it may be determined in operation P50 whether a pattern is converged. When the pattern satisfies a convergence condition in operation P50, the OPC may end. When the pattern does not satisfy the convergence condition in operation P50, the OPC method may proceed to operation P41 to adjust a bias of segments of a next count.

Figure 17:
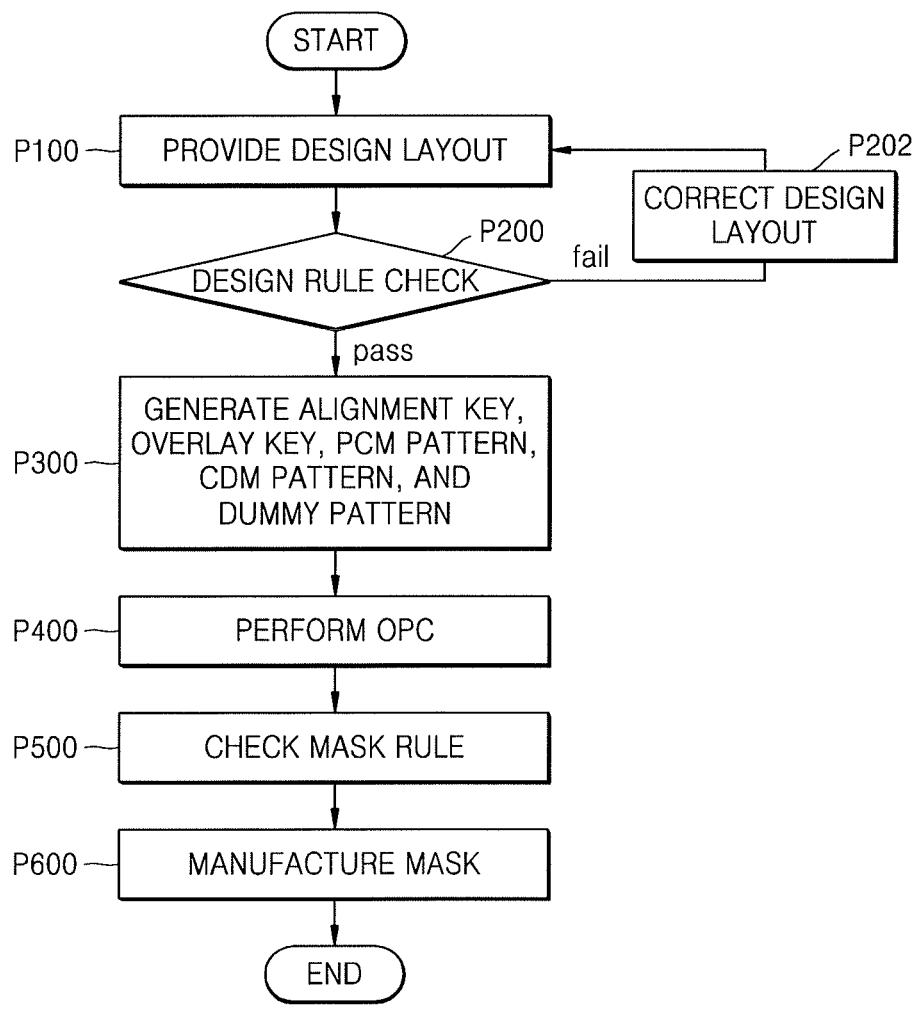
FIG. 17 illustrates a flowchart of a method of manufacturing a lithographic mask, according to some embodiments.

FIG. 17 is a flowchart of a method of manufacturing a lithographic mask, according to some embodiments.

Referring to FIG. 17, in operation P100, a design layout may be provided. The design layout may include various geometric patterns to implement a semiconductor device. The design layout may include a plurality of patterns designed according to certain design rules. The design layout may extend in first and second directions crossing orthogonally each other. The patterns may include line patterns having a certain width and extending in the first or second direction. The various geometric patterns of the design layout may correspond to a metal pattern, an oxide pattern, a semiconductor pattern, and the like to implement various components of a semiconductor device to be manufactured. The components may include, e.g., active areas, gate electrodes, metal lines or vias of an interlayer interconnection part, and bonding pads. The components may be formed on a semiconductor substrate or on various material layers deposited on the semiconductor substrate. The design layout may be stored as one or more data files having information on the geometric patterns. For example, the design layout may be stored in an arbitrary appropriate computer-readable data format such as a graphic data system II (GDSII)data format, a Caltech intermediate form (CIF) data format, or an open artwork system interchange standard (OASIS) data format.

Thereafter, in operation P200, a design rule may be checked. The design rule check may include checking whether the design layout satisfies the design rule. When a part violating the design rule or a design error is discovered (fail), the design layout may be corrected to a corrected layout in operation P202.

When passing the design rule check (pass) in operation P200, in operation P300, an alignment key, an overlay key, a process control monitoring (PCM) pattern, a critical dimension (CD) monitoring pattern, and a dummy pattern, which are a mask framework for mask design and manufacturing, may be added.

The alignment key may be a pattern prepared to identify a position of each of patterns formed on an underlying layer in a lithography process. The overlay key is to measure overlay that is an alignment error between adjacent layers, and may have a diffraction grating structure or a box in box (BIB) structure. The CD monitoring pattern may be to examine CD of patterns. The dummy pattern may be generated to correct an OPE and to prevent an optical effect according to a pattern density difference on the design layout.

Thereafter, in operation P400, OPC may be performed. The OPC method in operation P400 may include any one of the OPC method described with reference to FIGS. 2 to 12 and the OPC method described with reference to FIGS. 13 to 15.

Thereafter, in operation P500, a mask rule may be checked. The mask rule check is to guarantee sufficient margins when a pattern is implemented through a real process in consideration of process distribution in semiconductor manufacturing processes. The mask rule check may include checking whether an integrated circuit (IC) design layout on which OPC has been performed satisfies limits of a particular geometric pattern and limits of connectivity guarantee between patterns.

According to circumstances, the method for manufacturing a lithographic mask may further include lithography process checking (LPC) for simulating a pattern to be actually implemented in a lithography process. According to a result of the LPC, process parameters may be adjusted.

The process parameters may include parameters associated with various processes of an IC manufacturing cycle, parameters associated with tools used to manufacture an IC, and/or parameters associated with other aspects of a manufacturing process. To prevent a defect due to a tolerance by ensuring a sufficient margin from semiconductor manufacturing processes, the mask rule check of checking whether a corrected design layout conforms to mask generation rules including limits in a particular geometric shape and connection may be included.

A series of processes, including operations P300 to P500, of preparing data for manufacturing a mask may be referred to as a mask data preparation operation. According to some embodiments, the mask data preparation may include, for example, format conversion called fracturing, barcode for mechanical reading, a standard mask pattern for inspection, augmentation of a job deck and the like, and automatic or manual verification. According to some embodiments, the job deck may indicate generating a text file associated with arrangement information of multi-mask files, a reference dose, and a series of commands such as an exposure speed and scheme.

Thereafter, in operation P600, a lithographic mask may be manufactured. The manufacturing of the lithographic mask may include exposing a substrate for the mask, and according to some embodiments of the inventive concept, subsequent processes may include, for example, developing, etching, cleaning, and the like. According to some embodiments, the exposure may be performed by, e.g., electron beam writing. According to some embodiments, the electron beam writing may be performed by a method such as gray writing using a multi-beam mask writer (MBMW). According to some embodiments, the electron beam writing may be performed by using a variable shape beam (VSB) writer.

According to some embodiments, after manufacturing the lithographic mask, processes of measuring the lithographic mask, checking a defect thereof, and repairing the checked defect may be further performed.

According to some embodiments, as a final process for forming the lithographic mask, a pellicle coating process may be performed. The pellicle coating process is to confirm that no contamination particles or chemical stains exist on the surface of the lithographic mask through final cleaning and inspection and then coat the surface of the lithographic mask with pellicle in order to protect the lithographic mask from contamination, shock, or the like during a delivery of the lithographic mask and an available lifespan of the lithographic mask.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, embodiments provide an OPC method with improved reliability and a method of manufacturing a lithographic mask by using the same. That is, according to embodiments, in an edge dissection operation, for patterns extending from a background region to the outside across a boundary region (and having lengths longer than a set length), uniform dissection at edges is performed based on a global coordinate system, while uniform dissection of other patterns is performed based on local coordinate systems having vertexes as origins. AS such, uniformity across boundaries may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a lithographic mask, the method comprising:
    providing a design layout including a plurality of patterns for manufacturing a semiconductor device;
    performing an optical proximity correction (OPC) on the design layout for correcting an optical proximity effect (OPE), such that a corrected design layout is formed; and
    forming the lithographic mask based on the corrected design layout,
    wherein performing the OPC includes:
        generating a plurality of segments by dividing edges of the plurality of patterns; and
        adjusting a bias of the plurality of segments to form the corrected design layout, wherein generating the plurality of segments includes:
    determining, as first dissection positions, positions spaced apart by a first length from each of corners of the plurality of patterns,
    determining, as second dissection positions, positions obtained by vertically or horizontally projecting each of the corners onto adjacent patterns,
    determining third dissection positions along opposite ones of the edges of the plurality of patterns to adjust widths of the plurality of patterns,
    performing a local uniform dissection for determining fourth dissection positions for each second length based on local coordinate systems using the corners as origins, and
    performing a global uniform dissection for determining fifth dissection positions for each third length based on a global coordinate system that is a coordinate system of an entire design layout.

2. The method as claimed in claim 1, wherein the plurality of patterns includes:
first patterns dissected in the local uniform dissection; and
second patterns dissected in the global uniform dissection.

3. The method as claimed in claim 2, wherein the first patterns are less than a critical length, and the second patterns are greater than or equal to the critical length.

4. The method as claimed in claim 2, wherein:
the design layout is divided into a plurality of patches,
the plurality of patches includes first and second patches adjacent to each other,
the second patch includes a first background region for generating the plurality of segments for the first patch, and
the first patch includes a second background region for generating the plurality of segments for the second patch.

5. The method as claimed in claim 4, wherein the first patterns extend only on the first background region and the second background region.

6. The method as claimed in claim 4, wherein the first patterns extend only on the first patch.

7. The method as claimed in claim 4, wherein the second patterns extend on the first background region and the second background region, and further extend on at least any one of the first and second patches outside the first background region and the second background region.

8. The method as claimed in claim 1, further comprising a contradiction solving operation of excluding any one of two neighboring dissection positions among the first to fifth dissection positions when a distance between the two neighboring dissection positions is less than a fourth length.

9. The method as claimed in claim 1, wherein, when a distance between two neighboring dissection positions among the first to fifth dissection positions is greater than a fifth length, a center point of the two neighboring dissection positions is determined as a sixth dissection position.

10. A method of manufacturing a lithographic mask, the method comprising:
providing a design layout including a plurality of patterns for manufacturing a semiconductor device;
performing an optical proximity correction (OPC) on the design layout for correcting an optical proximity effect (OPE), such that a corrected design layout is formed; and
forming the lithographic mask based on the corrected design layout,
wherein performing the OPC includes:
    defining a plurality of dissection positions on each of edges of the plurality of patterns so as to dissect each of the edges into a plurality of segments; and
    adjusting a bias of the plurality of segments,
wherein the plurality of dissection positions includes:
    first dissection positions defined as positions spaced apart by a first length from each of corners of each of the plurality of patterns,
    second dissection positions defined by projections from each of the corners onto adjacent patterns,
    third dissection positions along opposite ones of the edges of the plurality of patterns for adjusting widths of the plurality of patterns,
    fourth dissection positions defined for each second length based on each local coordinate system having any one of the corners of the plurality of patterns as an origin, and
    fifth dissection positions defined for each third length based on a global coordinate system that is a coordinate system of an entire design layout, and
wherein defining the plurality of dissection positions includes excluding any one of two neighboring dissection positions among the first to fifth dissection positions from the first to fifth dissection positions when a distance between the two neighboring dissection positions is less than a fourth length.

11. The method as claimed in claim 10, wherein defining the plurality of dissection positions includes determining a center point of the two neighboring dissection positions as a sixth dissection position when the distance between the two neighboring dissection positions is greater than a fifth length.

12. A method of manufacturing a lithographic mask, the method comprising:
providing a design layout including a plurality of patterns for manufacturing a semiconductor device;
performing an optical proximity correction (OPC) on the design layout for correcting an optical proximity effect (OPE), such that a corrected design layout is formed; and
forming the lithographic mask based on the corrected design layout,
wherein performing the OPC includes:
    generating a plurality of segments by dividing edges of the plurality of patterns; and
    adjusting a bias of the plurality of segments to form the corrected design layout,
wherein generating the plurality of segments includes:
    determining, as first dissection positions, positions spaced apart by a first length from each of corners of the plurality of patterns,
    determining, as second dissection positions, positions obtained by vertically or horizontally projecting each of the corners onto adjacent patterns,
    performing local uniform dissection for determining third dissection positions for each second length based on local coordinate systems using the corners as origins, and
    performing global uniform dissection for determining fourth dissection positions for each third length based on a global coordinate system that is a coordinate system of an entire design layout.

13. The method as claimed in claim 12, wherein the plurality of patterns includes:
first patterns dissected in the local uniform dissection; and
second patterns dissected in the global uniform dissection.

14. The method as claimed in claim 13, wherein the first patterns are less than a critical length, and the second patterns are greater than or equal to the critical length.

15. The method as claimed in claim 13, wherein:
the design layout is divided into a plurality of patches,
the plurality of patches includes first and second patches adjacent to each other,
the second patch includes a first background region for generating the plurality of segments for the first patch, and
the first patch includes a second background region for generating the plurality of segments for the second patch.

16. The method as claimed in claim 15, wherein the first patterns extend only on the first background region and the second background region.

17. The method as claimed in claim 15, wherein the first patterns extend only on the first patch.

18. The method as claimed in claim 15, wherein the second patterns extend on the first background region and the second background region, and further extend on at least any one of the first and second patches outside the first background region and the second background region.

19. The method as claimed in claim 12, further comprising a contradiction solving operation of excluding any one of two neighboring dissection positions among the first to fourth dissection positions when a distance between the two neighboring dissection positions is less than a fourth length.

20. The method as claimed in claim 12, wherein, when a distance between two neighboring dissection positions among the first to fourth dissection positions is greater than a fifth length, a center point of the two neighboring dissection positions is determined as a sixth dissection position.

* * * * *